(12) United States Patent
Shields et al.

(10) Patent No.: US 11,651,636 B1
(45) Date of Patent: May 16, 2023

(54) SYSTEM AND METHOD FOR PROVIDING RELEVANT AND TIMELY INFORMATION ASSOCIATED WITH A TRAVEL ITINERARY

(71) Applicant: AMERICAN AIRLINES, INC., Fort Worth, TX (US)

(72) Inventors: John Shields, Fort Worth, TX (US); Pedram Kazemi, Plano, TX (US)

(73) Assignee: AMERICAN AIRLINES, INC., Fort Worth, TX (US)

( * ) Notice: Subject to any disclaimer, the term of this patent is extended or adjusted under 35 U.S.C. 154(b) by 677 days.

(21) Appl. No.: 15/606,175

(22) Filed: May 26, 2017

Related U.S. Application Data

(63) Continuation of application No. 13/173,909, filed on Jun. 30, 2011, now Pat. No. 9,665,998.

(51) Int. Cl.
*G06Q 10/00* (2023.01)
*G07C 9/20* (2020.01)

(52) U.S. Cl.
CPC .................... *G07C 9/20* (2020.01)

(58) Field of Classification Search
None
See application file for complete search history.

(56) References Cited

U.S. PATENT DOCUMENTS

| | | | |
|---|---|---|---|
| 6,587,867 B1 | 7/2003 | Miller et al. | |
| 7,363,241 B1 | 4/2008 | Dong | |
| 2002/0051188 A1 | 5/2002 | Kim | |
| 2003/0055689 A1 | 3/2003 | Block et al. | |
| 2006/0139354 A1 | 6/2006 | Suma | |
| 2007/0022015 A1 | 1/2007 | Tarinelli et al. | |
| 2008/0300909 A1 | 12/2008 | Rikhtverchik et al. | |
| 2009/0150764 A1 | 6/2009 | Farrell et al. | |
| 2010/0093316 A1* | 4/2010 | Doppler | H04M 1/72522 455/414.1 |
| 2010/0185667 A1 | 7/2010 | O'Hanlon | |
| 2010/0190510 A1 | 7/2010 | Maranhas et al. | |
| 2010/0228577 A1 | 9/2010 | Cunningham et al. | |
| 2011/0010464 A1* | 1/2011 | Morrison | G06F 16/29 709/245 |
| 2011/0093301 A1 | 4/2011 | Walker | |

OTHER PUBLICATIONS

FlyerTalk, "The problem with TripIt" (Year: 2010).*
Non-Final Office Action regarding U.S. Appl. No. 13/173,909 dated Aug. 2, 2013, 6 pages.
Non-Final Office Action regarding U.S. Appl. No. 13/173,909 dated Aug. 28, 2014, 6 pages.
Final Office Action regarding U.S. Appl. No. 13/173,909 dated Mar. 9, 2015, 5 pages.
Non-Final Office Action regarding U.S. Appl. No. 13/173,909 dated Jul. 16, 2015 6 pages.
Final Office Action regarding U.S. Appl. No. 13/173,909 dated Jan. 29, 2016, 7 pages.
Non-Final Office Action regarding U.S. Appl. No. 13/173,909 dated May 20, 2016, 7 pages.
Notice of Allowance regarding U.S. Appl. No. 13/173,909 dated Jan. 27, 2017, 9 pages.

* cited by examiner

*Primary Examiner* — Tonya Joseph
(74) *Attorney, Agent, or Firm* — Haynes and Boone, LLP

(57) ABSTRACT

A system and method for providing relevant and timely information associated with a travel itinerary, such as an airline travel itinerary. In an exemplary embodiment, one of a plurality of home screens is displayed on a portable user device when an application is opened on the portable user device.

9 Claims, 25 Drawing Sheets

SYSTEM AND METHOD FOR PROVIDING RELEVANT AND TIMELY INFORMATION ASSOCIATED WITH A TRAVEL ITINERARY

CROSS-REFERENCE TO RELATED APPLICATION

This application is a continuation of U.S. application Ser. No. 13/173,909, filed Jun. 30, 2011, the entire disclosure of which is hereby incorporated herein by reference.

BACKGROUND

The present disclosure relates in general to providing relevant and timely information, and in particular to a system and method for providing relevant and timely information associated with a travel itinerary, such as an airline travel itinerary, to a user of a portable user device.

DETAILED DESCRIPTION

Figure 1:
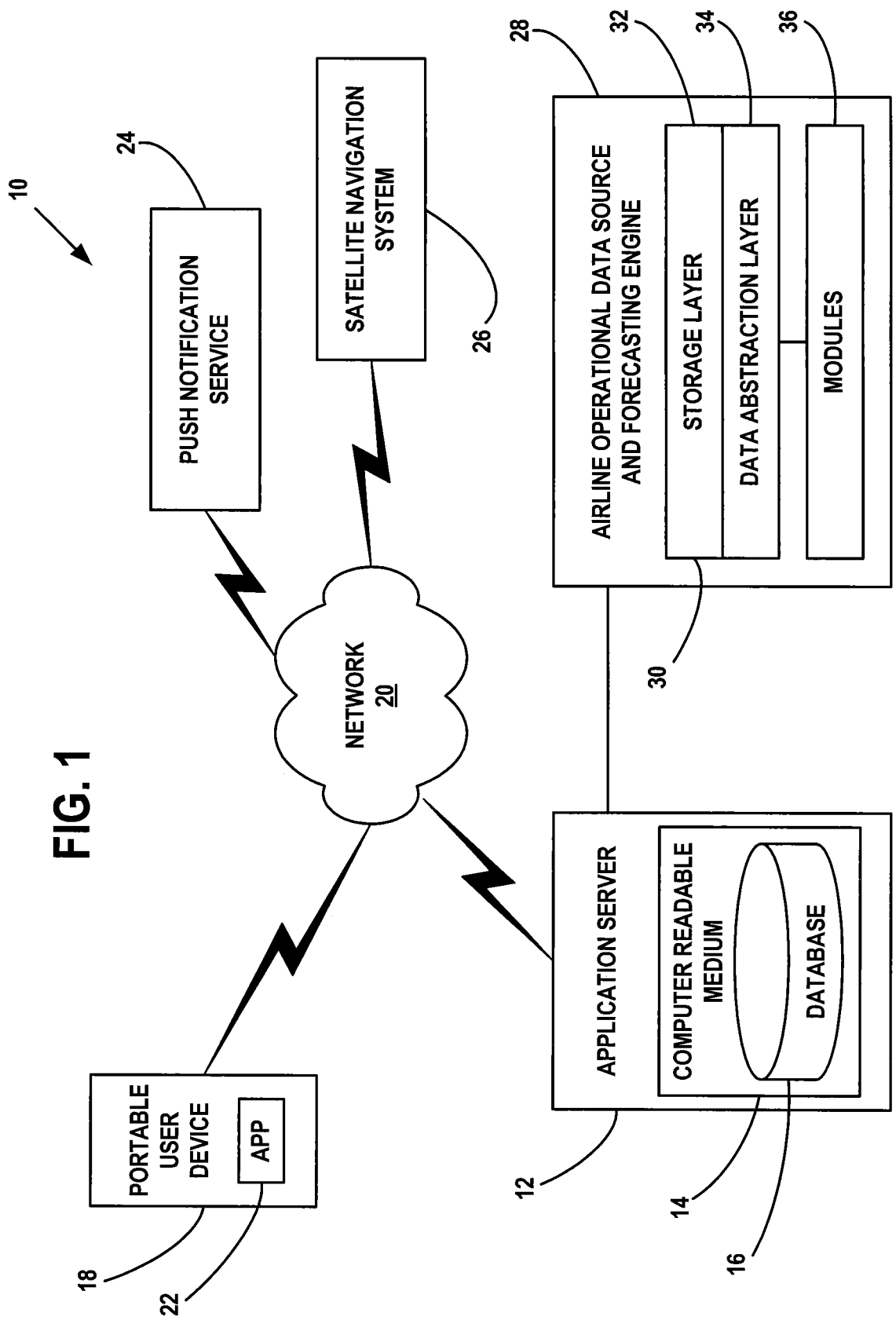
FIG. 1 is a diagrammatic illustration of a system according to an exemplary embodiment, the system including a portable user device.

In an exemplary embodiment, as illustrated in FIG. 1, a system is generally referred to by the reference numeral 10 and includes an application server 12, which includes a computer readable medium 14. Instructions accessible to, and executable by, the application server 12 are stored on the computer readable medium 14. A database 16 is also stored in the computer readable medium 14. A portable user device 18 is operably coupled to, and in communication with, the application server 12 via a network 20.

A mobile application (or "app") 22 is stored in the portable user device 18. The portable user device 18 and the application 22 will be discussed in further detail below. A push notification service 24 is operably coupled to, and in communication with, each of the application server 12 and the portable user device 18 via the network 20. In several exemplary embodiments, the push notification service 24 includes one or more servers and/or networks, which are adapted to receive a notification from the application server 12 and then push the notification to the portable user device 18, under conditions to be described below. A satellite navigation system 26 is operably coupled to, and in communication with, the portable user device 18 via the network 20. In several exemplary embodiments, the satellite navigation system 26 is the Global Positioning System (GPS).

An airline operational data source and forecasting engine 28 is operably coupled to, and in communication with, the application server 12. The engine 28 includes a database 30, which, in turn, includes an abstraction layer 32 and a storage layer 34. Data entering the engine 28 is stored in the storage layer 34 and is also passed through the abstraction layer 32, which routes the data to one or more modules 36 that are operably coupled to, and in communication with, the database 30. The modules 36 utilize and augment the data entering the engine 28.

In an exemplary embodiment, the server 12 is a web application server, which in several exemplary embodiments includes and/or executes one or more web-based programs, Intranet-based programs, and/or any combination thereof. In an exemplary embodiment, the network 20 includes the Internet, one or more local area networks, one or more wide area networks, one or more cellular networks, one or more wireless networks, one or more voice networks, one or more data networks, one or more communication systems, and/or any combination thereof.

In several exemplary embodiments, the engine 28 provides automatic data collection and management functionality. The engine 28 collects and stores real-time travel data from multiple sources (not shown) and provides integrated data forecasts to the application server 12, as well as to the modules 36, the application 22, and other functional modules and external applications (not shown). In an exemplary embodiment, the travel data collected by the engine 28 is airline flight data that includes one or more of the following: scheduled airline flight departure times, scheduled airline flight arrival times, actual airline flight departure times, actual airline flight arrival times, latest published flight times and status, latest gate assignments, aircraft rotations, crew sequence information, passenger counts and connections, baggage counts and connections, crew legality information, curfew information, and slot restrictions. Additionally, the engine 28 is capable of generating forecasts of downline impacts as a result of existing delays throughout the system. In several exemplary embodiments, the engine 28 is, includes or is part of, one or more embodiments of airline operational data source and forecasting engines disclosed in U.S. patent application Ser. No. 12/683,984, the entire disclosure of which is incorporated herein by reference.

In several exemplary embodiments, one or more of the components of the system 10 and/or content stored therein, and/or any combination thereof, are part of, and/or are distributed throughout, the system 10 and/or one or more other components thereof. In several exemplary embodiments, the platforms of the system 10 are identical, different, or vary with respect to equipment, peripherals, hardware architecture and/or specifications, software architecture and/or specifications, and/or any combination thereof.

Figure 2A:
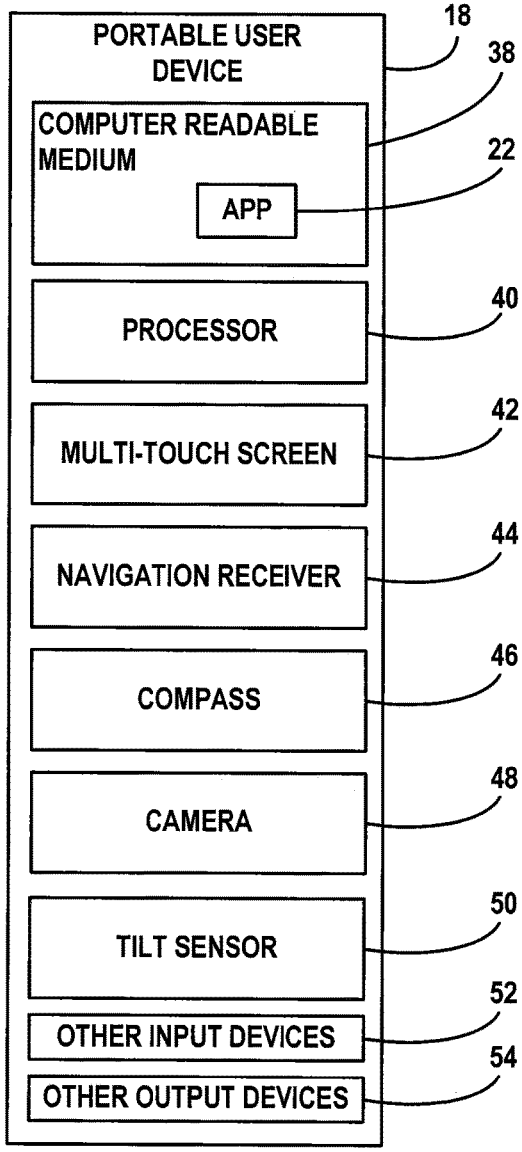
FIG. 2A is a diagrammatic illustration of the portable user device of FIG. 1, according to an exemplary embodiment, the portable user device including a compass.

In an exemplary embodiment, as illustrated in FIG. 2A with continuing reference to FIG. 1, the portable user device 18 is a handheld or otherwise portable user device which is carried by a user who is a customer of, for example, a commercial airline. In several exemplary embodiments, the portable user device 18 is a smartphone such as, for example, an iPhone® by Apple Inc. As shown in FIG. 2A, the portable user device 18 includes a computer readable medium 38, in which the application 22 is stored. The portable user device 18 further includes a processor 40, a multi-touch screen 42, a navigation receiver 44, a compass 46, a camera 48, a tilt sensor 50, one or more other input devices 52, and one or more other output devices 54. In an exemplary embodiment, the tilt sensor 50 includes one or more accelerometers.

In an exemplary embodiment, instructions accessible to, and executable by, the processor 40 are stored on the computer readable medium 38. In an exemplary embodiment, the navigation receiver 44 is a GPS receiver. In an exemplary embodiment, the navigation receiver 44 is a GPS receiver with Wide Area Augmentation System (WAAS) capability. In an exemplary embodiment, the camera 48 is a digital camera which is able to capture still photographs and/or video. In an exemplary embodiment, the input devices 52 are, include, or are part of, the multi-touch screen 42, and/or include one or more keyboards, pin pads, scanners, buttons, card readers, and/or any combination thereof. In an exemplary embodiment, the one or more output devices 54 are, include, or are a part of, the multi-touch screen 42, and/or include one or more graphical displays, printers, plotters, and/or any combination thereof. In an exemplary embodiment, the application 22 includes a computer program including a plurality of instructions, data, and/or any combination thereof. In an exemplary embodiment, the application 22 is an application written in, for example, HyperText Markup Language (HTML), Cascading Style Sheets (CSS), JavaScript, Extensible Markup Language (XML), asynchronous JavaScript and XML (Ajax), and/or any combination thereof. In an exemplary embodiment, the application 22 is a web-based application written in, for example, Java or Adobe Flex, which pulls real-time information from the application 22 and/or the engine 28. In an exemplary embodiment, the application 22 is a web-based application written in, for example, Java or Adobe Flex, which pulls real-time information from the server 12 and/or the engine 28, upon the execution, opening or start-up of the application 22. In an exemplary embodiment, the application 22 is a web-based application written in, for example, Java or Adobe Flex, which pulls real-time information from the server 12 and/or the engine 28, automatically refreshing with latest information every, for example, 45 seconds. In an exemplary embodiment, the portable user device 18 is a thin client and the server 12 and/or the engine 28 control at least a portion of the operation of the user device 18. In an exemplary embodiment, the portable user device 18 is a thick client, and/or functions as both a thin client and a thick client.

Figure 2C:
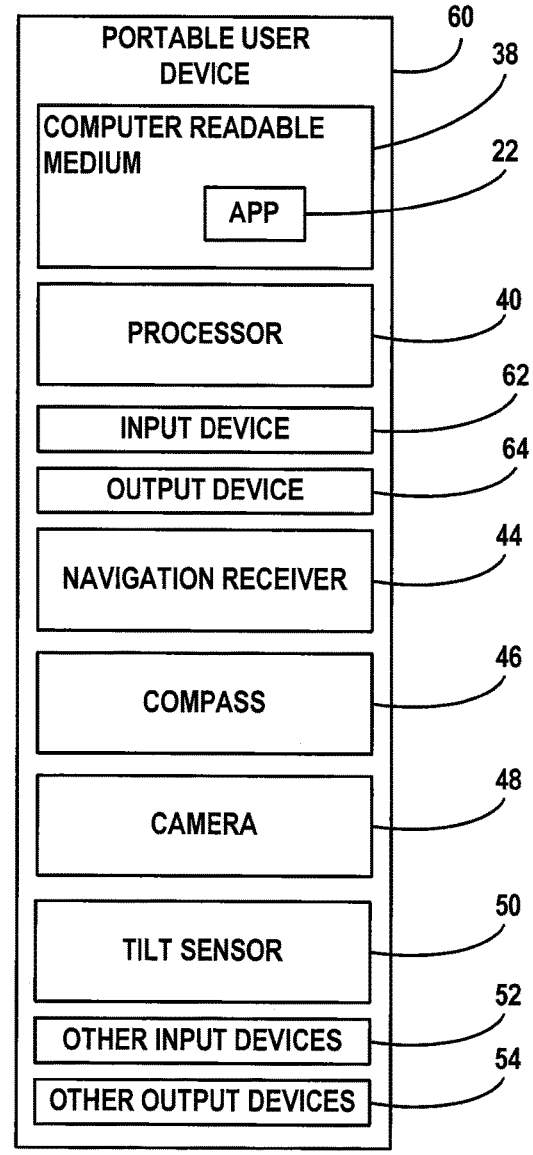
FIG. 2C is a diagrammatic illustration of a portable user device according to another exemplary embodiment.
Figure 2B:
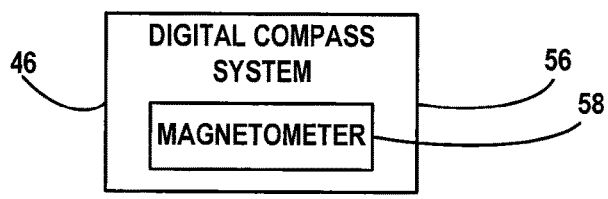
FIG. 2B is a diagrammatic illustration of the compass of the portable user device of FIG. 2A, according to an exemplary embodiment.

In an exemplary embodiment, as illustrated in FIG. 2B with continuing reference to FIGS. 1 and 2A, the compass 46 includes a digital compass system 56 including an internal magnetometer 58.

In an exemplary embodiment, as illustrated in FIG. 2C with continuing reference to FIGS. 1, 2A and 2B, instead of, or in addition to the portable user device 18, the system 10 includes a portable user device 60, which is operably coupled to, and in communication with, each of the application server 12, the push notification service 24, and the satellite navigation system 26 via the network 20. The portable user device 60 includes several of the components of the portable user device 18, which same components are given the same reference numerals. As shown in FIG. 2C, instead of the multi-touch screen 42, the portable user device 60 includes an input device 62 and an output device 64. In several exemplary embodiments, the input device 62 is, includes, or is part of, one or more keyboards, pin pads, scanners, buttons, card readers, and/or any combination thereof. In several exemplary embodiments, the output device 64 is, includes, or is part of, one or more graphical displays, printers, plotters, and/or any combination thereof. Additional exemplary embodiments of the portable user device 60 include aspects and/or features that are substantially identical to aspects and/or features of the above-described exemplary embodiments of the portable user device 18.

Figure 3:
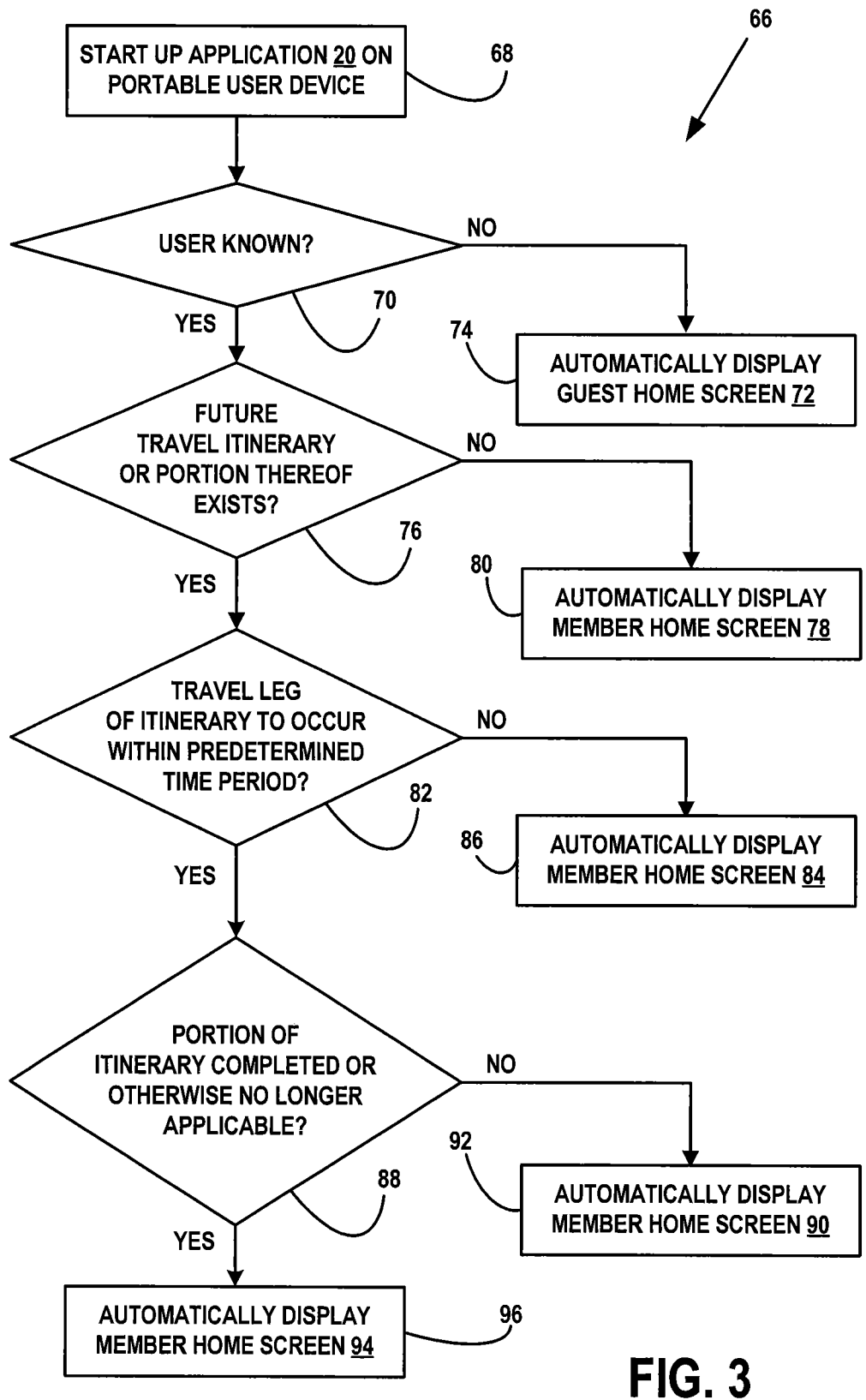
FIG. 3 is a flow chart illustration of a method of operating the system of FIG. 1, according to an exemplary embodiment.

In an exemplary embodiment, as illustrated in FIG. 3 with continuing reference to FIGS. 1, 2A, 2B and 2C, a method of operating the system 10 is generally referred to by the reference numeral 66. The method 66 includes opening, executing, running or otherwise starting up the application 22 on the portable user device 18 in step 68. It is determined in step 70 whether the user of the portable user device 18 (who has executed or started up the application 22) is known to the application 22 and/or the application server 12. If it is determined in the step 70 that the user is not known, then a guest home interface or screen 72 is automatically displayed on the portable user device 18 in step 74 in response to the execution or startup of the application 22. If it is determined in the step 70 that the user is known, then it is determined in step 76 whether a future travel itinerary or a portion thereof exists that is associated with the user. If it is determined in the step 76 that a future travel itinerary or a portion thereof associated with the user does not exist, then a no-travel-itinerary member home screen 78 is automatically displayed on the portable user device 18 in step 80 in response to the execution or startup of the application 22. If it is determined in the step 76 that a future travel itinerary or a portion thereof associated with the user does exist, then it is determined in step 82 whether the future travel itinerary includes one or more travel legs that are to occur within a predetermined time period. If not, then a no-travel-itinerary-within-the-predetermined-time-period member home screen 84 is automatically displayed on the portable user device 18 in step 86 in response to the execution or startup of the application 22. If it is determined in the step 82 that the future travel itinerary or a portion thereof includes one or more travel legs that are to occur within the predetermined time period, then it is determined in step 88 whether a portion of the travel itinerary has been completed or otherwise is no longer applicable. If not, then an initial-travel member home screen 90 is automatically displayed on the portable user device 18 in step 92 in response to the execution or startup of the application 22. If it is determined in the step 88 that a portion of the travel itinerary has been completed or otherwise is no longer applicable, then a during-travel member home screen 94 is automatically displayed on the portable user device 18 in step 96 in response to the execution or startup of the application 22.

In the following exemplary description of the exemplary embodiment of the method 66, the user of the portable user device 18 is a customer of a commercial airline; the travel itinerary is an airline flight travel itinerary; and the customer is expected to conduct air travel, and/or is conducting air travel, in accordance with the airline flight travel itinerary. However, in several exemplary embodiments, the user of the portable user device 18 may be, for example, a customer of a rail line, bus line, ferry line, boat line, etc.; the travel itinerary may be, for example, a rail itinerary, bus itinerary, ferry itinerary, boat itinerary, etc.; and the customer may be, for example, expected to conduct travel, and/or is conducting travel, in accordance with the travel itinerary. Further, in several exemplary embodiments, the user of the portable user device 18 may be, for example, a customer of a shipping company; the travel itinerary may be, for example, a shipping itinerary by air, sea and/or land; and the customer may be, for example, expected to monitor and/or control the shipment of goods by air, sea and/or land in accordance with the shipping itinerary.

In an exemplary embodiment, to determine whether the user is known in the step 70, the application 22 detects whether an identifier associated with the portable user device 18 and thus the user thereof exists. This identifier may be stored in the computer readable medium 38 of the portable user device 18. In an exemplary embodiment, the identifier is assigned and stored on the portable user device 18 during the operation of the server 12 and its communication with the device 18 via the network 20. In an exemplary embodiment, the identifier is assigned and stored on the portable user device 18 in response to the user using the application 22 to enroll in a club or program maintained by the commercial airline, such as a frequent flyer program, thereby opening a frequent flyer account. In an exemplary embodiment, the identifier is assigned and stored on the portable user device 18 in response to the user using the application 22 to initially login into the frequent flyer program and access his or her frequent flyer account. In an exemplary embodiment, the identifier includes one or more name-value pairs, one of which is a user identification (user ID).

Figure 4:
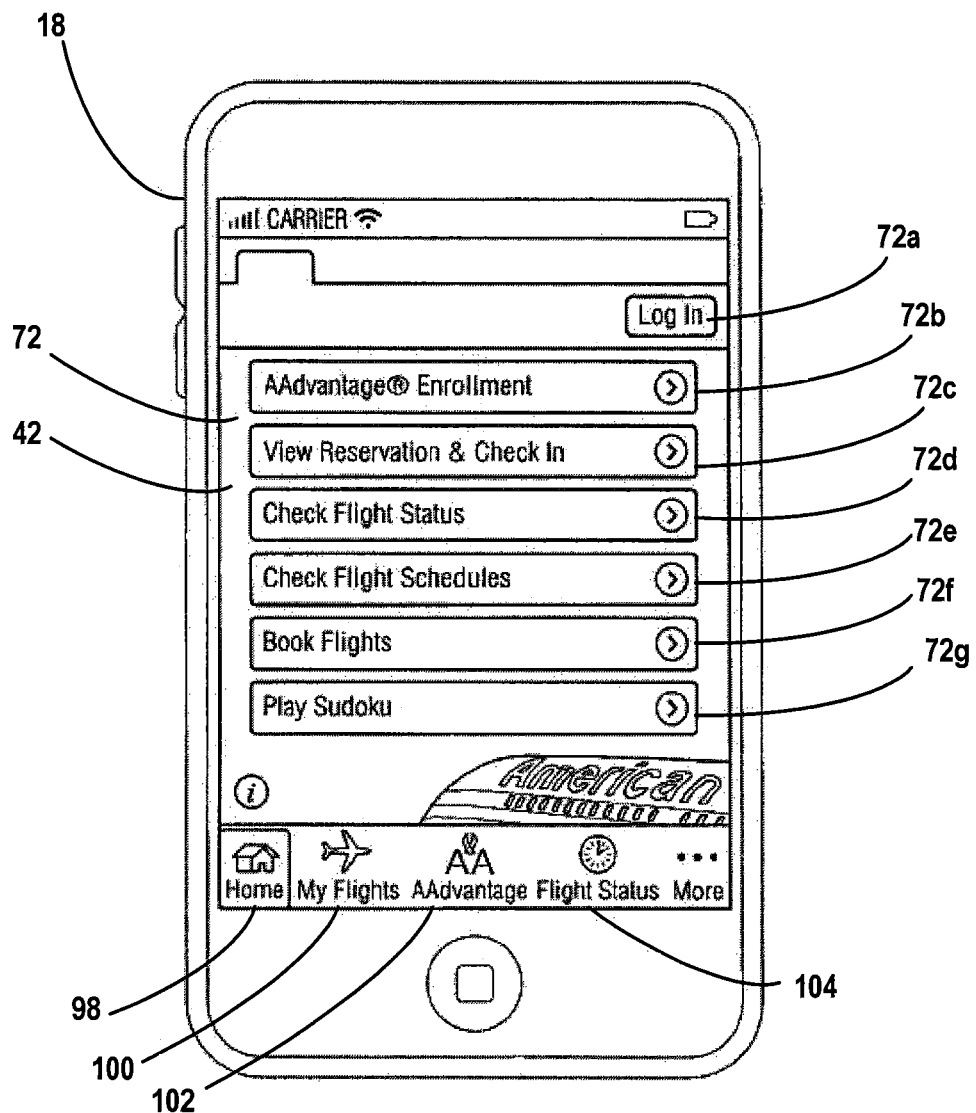
FIGS. 4, 5, 6, 7 and 8 are diagrammatic illustrations of different home screens displayed on the portable user device during, inter alia, the method of FIG. 3, according to an exemplary embodiment.

In an exemplary embodiment, as illustrated in FIG. 4 with continuing reference to FIGS. 1-3, to automatically display the guest home screen 72 in the step 74, the guest home screen 72 is automatically displayed on the multi-touch screen 42 of the device 18, as shown in FIG. 4. The guest home screen 72 does not include information specific to any identifier, and does not include information specific to any travel itinerary. More particularly, the guest home screen 72 includes a login button 72a, an enrollment button 72b, a view reservations and check in button 72c, a check flight status button 72d, a check flight schedules button 72e, a book flights button 72f, and a play game button 72g. In response to the selection of the login button 72a, the application 22 provides the user of the device 18 with the opportunity to login as a member of a frequent flyer club and access his or her frequent flyer account. In response to the selection of the enrollment button 72b, the application 22 provides the user of the device 18 with the opportunity to enroll in a frequent flyer club and open a frequent flyer account. In response to the selection of the view reservations and check in button 72c, the application 22 provides the user of the device 18 with the opportunity to view airline flight reservations and check in for one or more airline flights. In response to the selection of the check flight status button 72d, the application 22 provides the user of the device 18 with the opportunity to view the status of an airline flight by displaying on the multi-touch screen 42 the status of the airline flight. In response to the selection of the check flight schedules 72e, the application 22 provides the user of the device 18 with the opportunity to view airline flight schedules by displaying on the multi-touch screen 42 the airline flight schedules. In response to the selection of the book flights button 72f, the application 22 provides the user of the device 18 with the opportunity to book one or more airline flights. In response to the selection of the play game button 72g, the application 22 provides the user of the device 18 with the opportunity to play one or more games. In several exemplary embodiments, in response to the selection of the button 72a, 72b, 72c, 72d, 72e, 72f or 72g, the device 18 communicates with the application server 12, which, in turn, communicates with the engine 28, in order to, carry out the desired functionality such as, for example, providing the status of an airline flight, providing airline flight reservations and the opportunity to check in for one or more airline flights, providing flight schedules, providing the opportunity to book one or more airline flights, or playing games. The guest home screen 72 further includes a home button 98, a my flights button 100, a frequent flyer program button 102, and a flight status button 104.

In an exemplary embodiment, to determine whether a future travel itinerary or a portion thereof exists in the step 76 of the method 66, the application 22 accesses data stored in the computer readable medium 38, and/or communicates with the application server 12 to access data stored in the computer readable medium 14 and/or the engine 28. By accessing such data, the application 22 determines whether a future travel itinerary or a portion thereof exists that is associated with the identifier detected in the step 70, that is, with the user of the device 18 determined to be known in the step 70.

Figure 5:
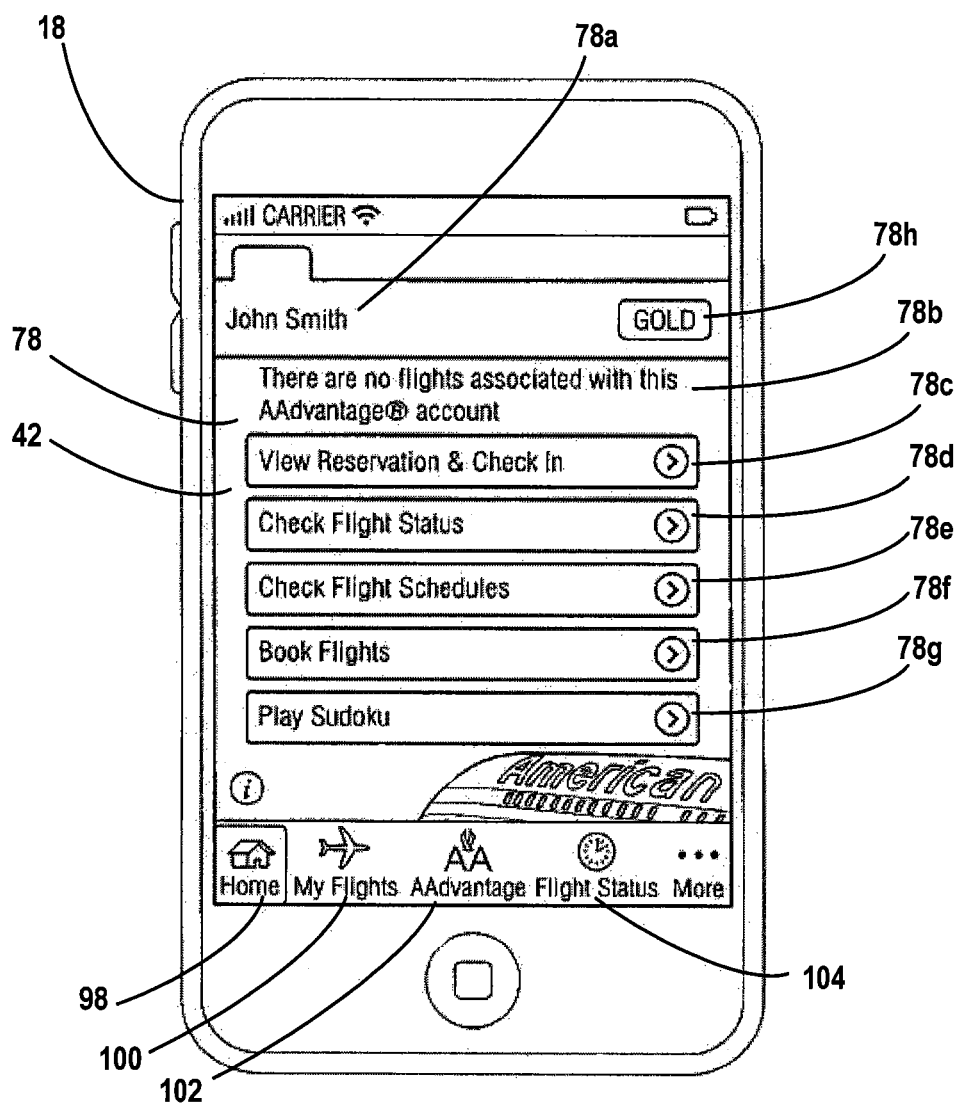

In an exemplary embodiment, as illustrated in FIG. 5 with continuing reference to FIGS. 1-4, to automatically display the no-travel-itinerary home screen 78 in the step 80 of the method 66, the home screen 78 is automatically displayed on the multi-touch screen 42 of the device 18, as shown in FIG. 5. The home screen 78 includes information specific to the identifier associated with the portable user device 18 and determined to exist in the step 70; however, the home screen 78 does not include any information specific to any travel itinerary. More particularly, the home screen 78 includes a name field 78a in which the name of the user of the device 18 is displayed, a message 78b that indicates that there are no airline flights associated with the identifier detected in the step 70, and buttons 78c, 78d, 78e, 78f and 78g, which are identical to the buttons 72c, 72d, 72e, 72f and 72g, respectively. The no-travel-itinerary home screen 78 further includes an indicator 78h that indicates a level or group of a frequent flyer club to which the user belongs, and the buttons 98, 100, 102 and 104.

In an exemplary embodiment, to determine whether a travel leg of a future travel itinerary is to occur within a predetermined time period in the step 82, the application 22 determines whether the departure time of a travel leg in the future itinerary or a portion thereof identified in the step 76 is to occur with the predetermined time period. In an exemplary embodiment, the predetermined time period is three days beginning at the current time.

Figure 6:
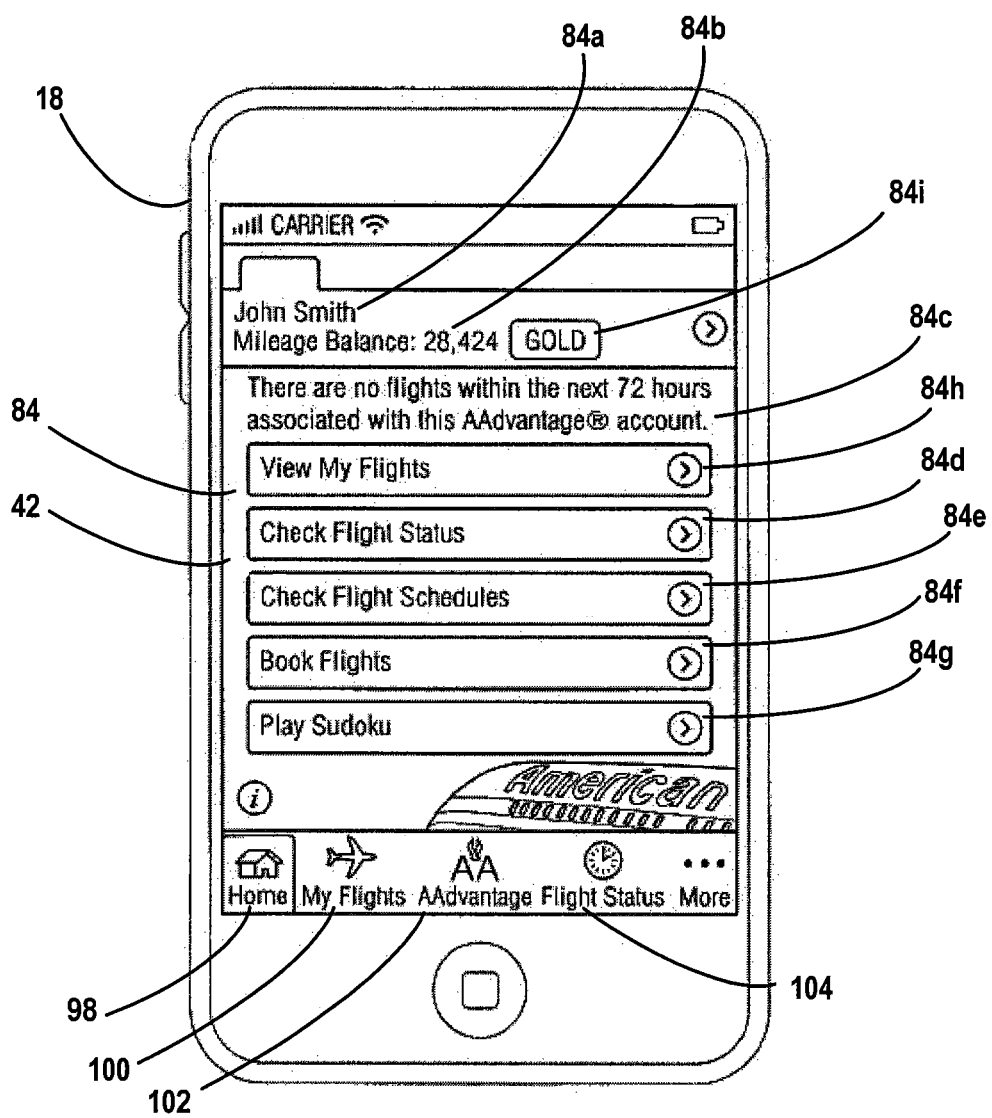

In an exemplary embodiment, as illustrated in FIG. 6 with continuing reference to FIGS. 1-5, to automatically display the no-travel-itinerary-within-the-predetermined-time-period member home screen 84 in the step 86, the home screen 84 is displayed on the multi-touch screen 42 of the device 18, as shown in FIG. 6. The home screen 84 includes information specific to the identifier associated with the portable user device 18 and determined to exist in the step 70; however, the home screen 84 does not include any information specific to any travel itinerary. More particularly, the home screen 84 includes a name field 84a that is identical to the name field 78a, a mileage balance field 84b in which the airline mileage balance of the user is displayed, a message 84c that indicates that there are no flights within the predetermined time period associated with the identifier detected in the step 70, and buttons 84d, 84e, 84f and 84g, which are identical to the buttons 72d, 72e, 72f and 72g, respectively. The no-travel-itinerary-within-the-predetermined-time-period member home screen 84 further includes a view my flights button 84h, an indicator 84i that is identical to the indicator 78h, and the buttons 98, 100, 102 and 104. In response to the selection of the button 84h, the application 22 provides the user of the device 18 with the opportunity to view past and/or upcoming flights by displaying on the multi-touch screen 42 past and/or upcoming travel itineraries and/or portions thereof associated with the identifier detected in the step 70. In an exemplary embodiment, the travel itineraries and/or portions thereof displayed in response to the selection of the button 84h include the future travel itinerary or portion thereof determined to exist in the step 76. In several exemplary embodiments, in response to the selection of the button 84h, the device 18 communicates with the application server 12, which, in turn, communicates with the engine 28, in order to carry out the desired functionality such as, for example, providing the past and/or upcoming travel itineraries.

In an exemplary embodiment, to determine whether a portion of the travel itinerary identified in the step 76 has been completed or is no longer applicable, the application 22 determines whether a portion of the travel itinerary identified in the step 76 has already occurred. For example, the application 22 may determine that an airline flight, which constitutes the portion of the travel itinerary, has already departed, is in flight, or has arrived at its destination, thus determining that the airline flight has been completed or is no longer applicable.

For another example, the application 22 may determine that the current time is past the occurrence of the departure or arrival of an airline flight, which constitutes a portion of the travel itinerary, thus determining that the airline flight has been completed or is no longer applicable.

For yet another example, the application 22 may determine that the user is located at the departure location of the second travel leg of the travel itinerary, making the first travel leg (such as, for example, the initial airline flight) no longer applicable. In an exemplary embodiment, the application 22 may determine that the user is located at the departure location of the second travel leg using the navigation receiver 44 and the satellite navigation system 26 of the portable device 18. The navigation receiver 44 communicates with the satellite navigation system 26 to determine the location of the receiver 44 and thus the portable device 18 and the user thereof. The application 22 communicates with the receiver 44 to determine the location of the receiver 44 and thus the portable device 18 and the user thereof. In an exemplary embodiment, the application 22 may determine that the user is located at the departure location of the second travel leg using geofencing, that is, by determining whether the portable device 18 and thus the user thereof has entered a geographic area having a defined perimeter, the coordinates of which are stored, in several exemplary embodiments, in the computer readable medium 38 of the portable device 18 and/or the computer readable medium 14 of the application server 12. The coordinates of the defined perimeter may correspond to the boundaries of the airport from which the second travel leg is to depart, and/or a wider area (such as a city, region or state) surrounding the airport. The navigation receiver 44 communicates with the satellite navigation system 26 to determine the location of the receiver 44 and thus the portable device 18 and the user thereof, and the application 22 and/or the application server 12 determine whether the location of the receiver 44 is within the geographic area having the defined perimeter for which the coordinates are stored.

For still yet another example, the application 22 may determine that the user associated with the identifier detected in the step 70 has already checked in for an airline flight which is part of the user's travel itinerary, thus determining that the check-in process has been completed or is no longer applicable.

Figure 7:
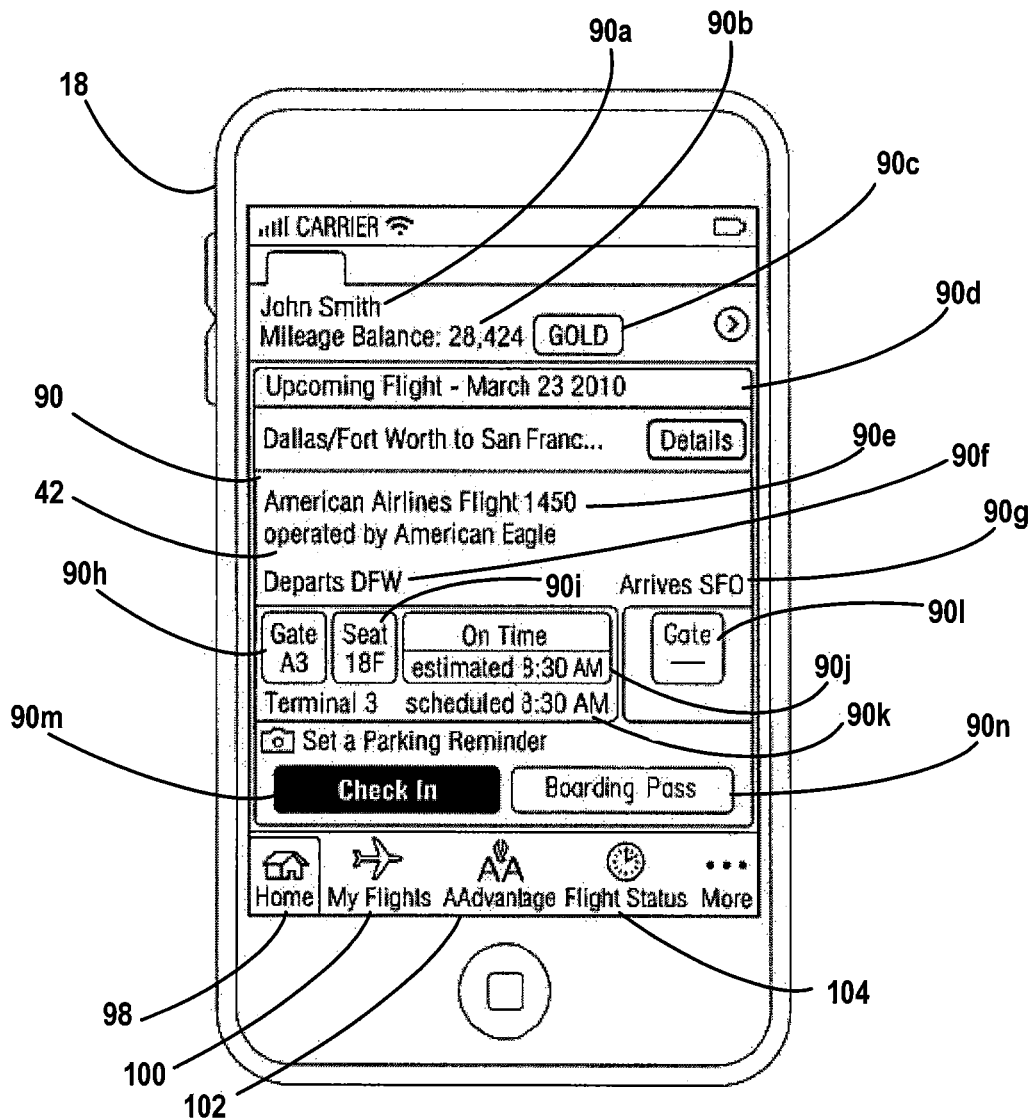

In an exemplary embodiment, as illustrated in FIG. 7 with continuing reference to FIGS. 1-6, to automatically display the initial-travel member home screen 90 in the step 92, the home screen 90 is displayed on the multi-touch screen 42 of the device 18, as shown in FIG. 7. The home screen 90 includes information specific to the identifier associated with the portable user device 18 and determined to exist in the step 70, and includes information specific to the travel itinerary or a portion thereof that is to occur within the predetermined time period, as determined in the step 82. More particularly, the home screen 90 includes a name field 90a that is identical to the name field 78a, a mileage balance field 90b that is identical to the mileage balance field 84b, an indicator 90c that is identical to the indicator 78h, and an upcoming flight box 90d, which displays details of the first airline flight on the travel itinerary identified in the step 76. The box 90d includes a flight number field 90e, a departure location field 90f, an arrival location field 90g, a departure gate field 90h, a seat assignment field 90i, an estimated time of departure field 90j, a schedule time of departure 90k, an arrival gate field 901, a check in button 90*m*, and a boarding pass button 90*n*. To the extent the data corresponding to the details of the first airline flight is available to the application 22 from, for example, the server 12 and/or the engine 28, the application 22 displays the data in one or more of the respective fields 90*e*, 90*f*, 90*g*, 90*h*, 90*i*, 90*j*, 90*k* and 901. For example, as shown in FIG. 7, data associated with the flight number, departure location, arrival location, departure gate, estimated time of departure and scheduled time of departure of the first airline flight on the travel itinerary identified in the step 76 is available to the application 22 and thus the data is displayed in the fields 90*e*, 90*f*, 90*g*, 90*h*, 90*i*, 90*j* and 90*k*, respectively. However, data associated with the arrival gate is not available to the application 22 and thus no data is displayed in the field 901.

Figure 8:
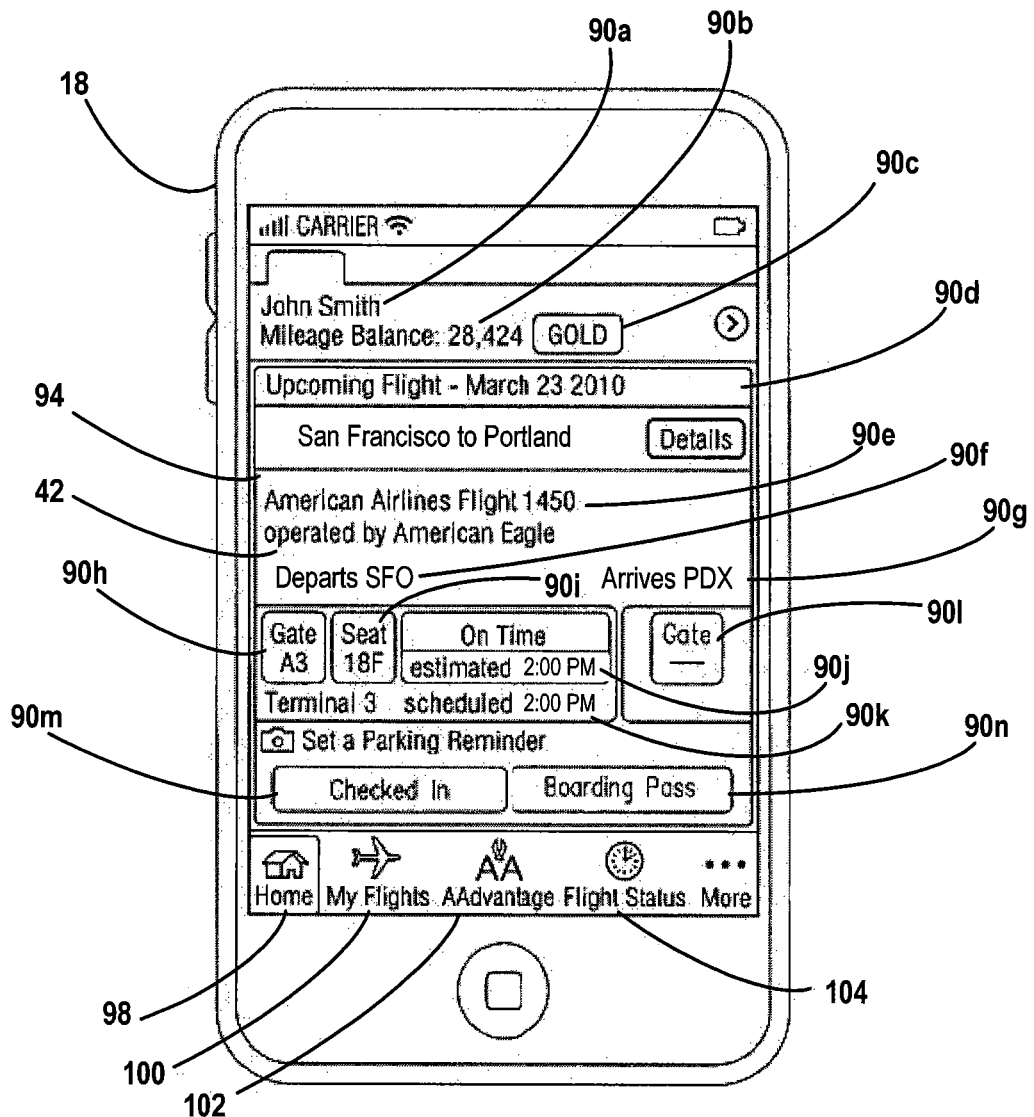

In an exemplary embodiment, as illustrated in FIG. 8 with continuing reference to FIGS. 1-7, to automatically display the during-travel member home screen 94 in the step 96, the home screen 94 is displayed on the multi-touch screen 42 of the device 18, as shown in FIG. 8. The home screen 94 includes information specific to the identifier associated with the portable user device 18 and determined to exist in the step 70, and includes information specific to the travel itinerary or a portion thereof that is to occur within the predetermined time period, as determined in the step 82. More particularly, the home screen 94 includes the indicator 90*c*, the box 90*d*, the buttons 90*m* and 90*n*, and the fields 90*a*, 90*b*, 90*e*, 90*e*, 90*f*, 90*g*, 90*h*, 90*i*, 90*j*, 90*k* and 901. As shown in FIG. 8, the during-travel home screen 94 reflects that the first airline flight on the travel itinerary identified in the step 76 has been completed, by displaying data associated with the next airline flight on the travel itinerary. More particularly, the departure location field 90*j* indicates a different departure location, San Francisco, which was the arrival location for the first airline flight on the travel itinerary. The arrival location field 90*g* indicates the arrival location of the next airline flight, Portland, Oreg.

In several exemplary embodiments, the system 10 and/or the method 66 utilizes the fact that the commercial airline knows who the customer of the commercial airline (i.e., the user of the portable device 18) is, where the customer is relative to the customer's itinerary, and displays intelligent (i.e., timely and relevant) information on the portable device 18 directly to the customer when the customer opens the application 22 on the portable device 18. In several exemplary embodiments, the system 10 and/or the method 66 automatically prioritize the most important features to the customer based on what the commercial airline knows about the customer.

Figure 9:
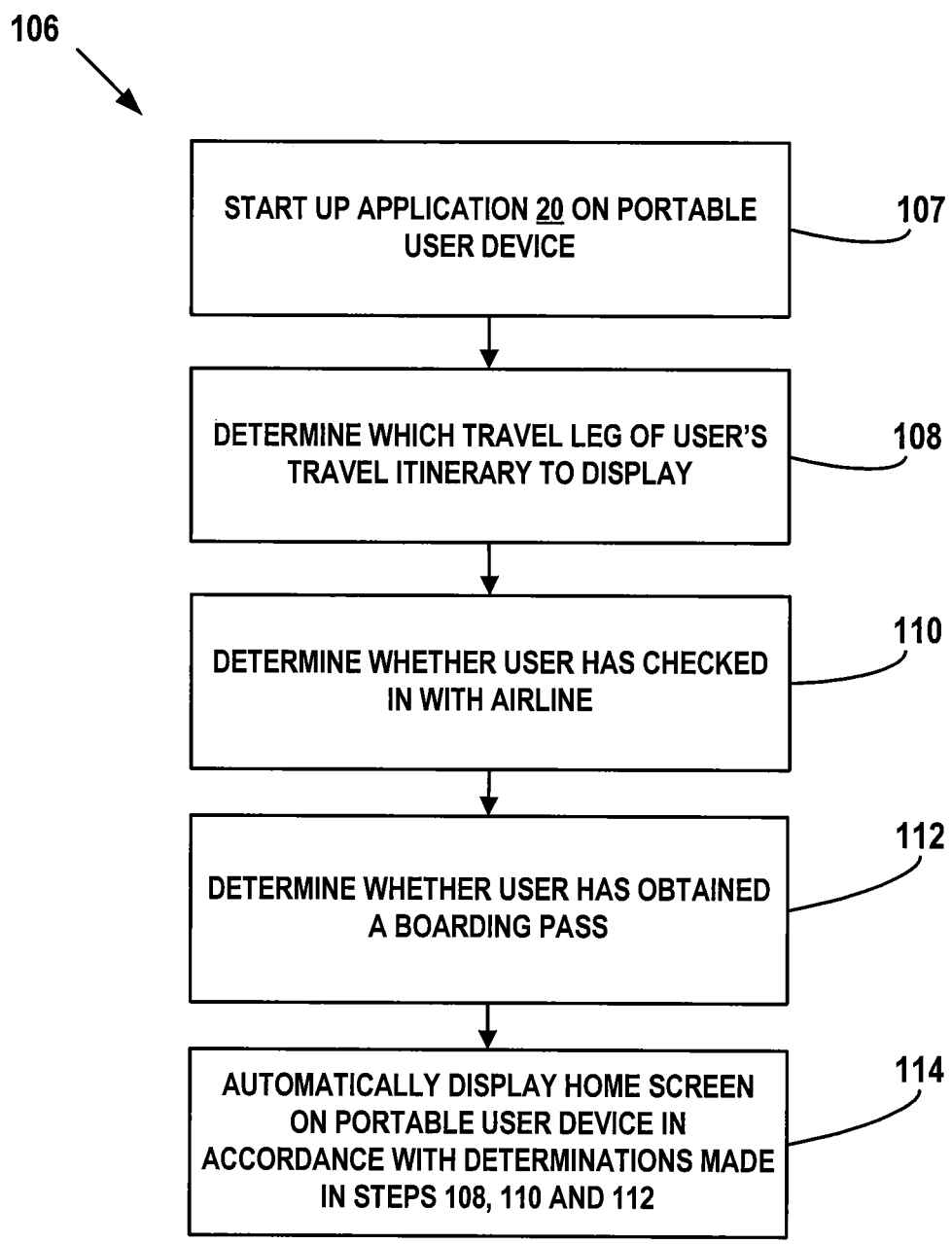
FIG. 9 is a flow chart illustration of a method of operating the system of FIG. 1, according to an exemplary embodiment.

In an exemplary embodiment, as illustrated in FIG. 9 with continuing reference to FIGS. 1-8, a method of operating the system 10 is generally referred to by the reference numeral 106 and includes opening, executing, running or otherwise starting up the application 22 on the portable user device 18 in step 107, determining which travel leg of the user's travel itinerary to display in step 108, determining whether the user of the portable device 18 has checked in with the commercial airline in step 110, determining whether the user of the portable device 18 has obtained a boarding pass in step 112, and in step 114 automatically displaying a home screen on the portable user device 18 in accordance with the determinations made in the steps 108, 110 and 112 and in response to the execution or startup of the application 22.

Figure 10:
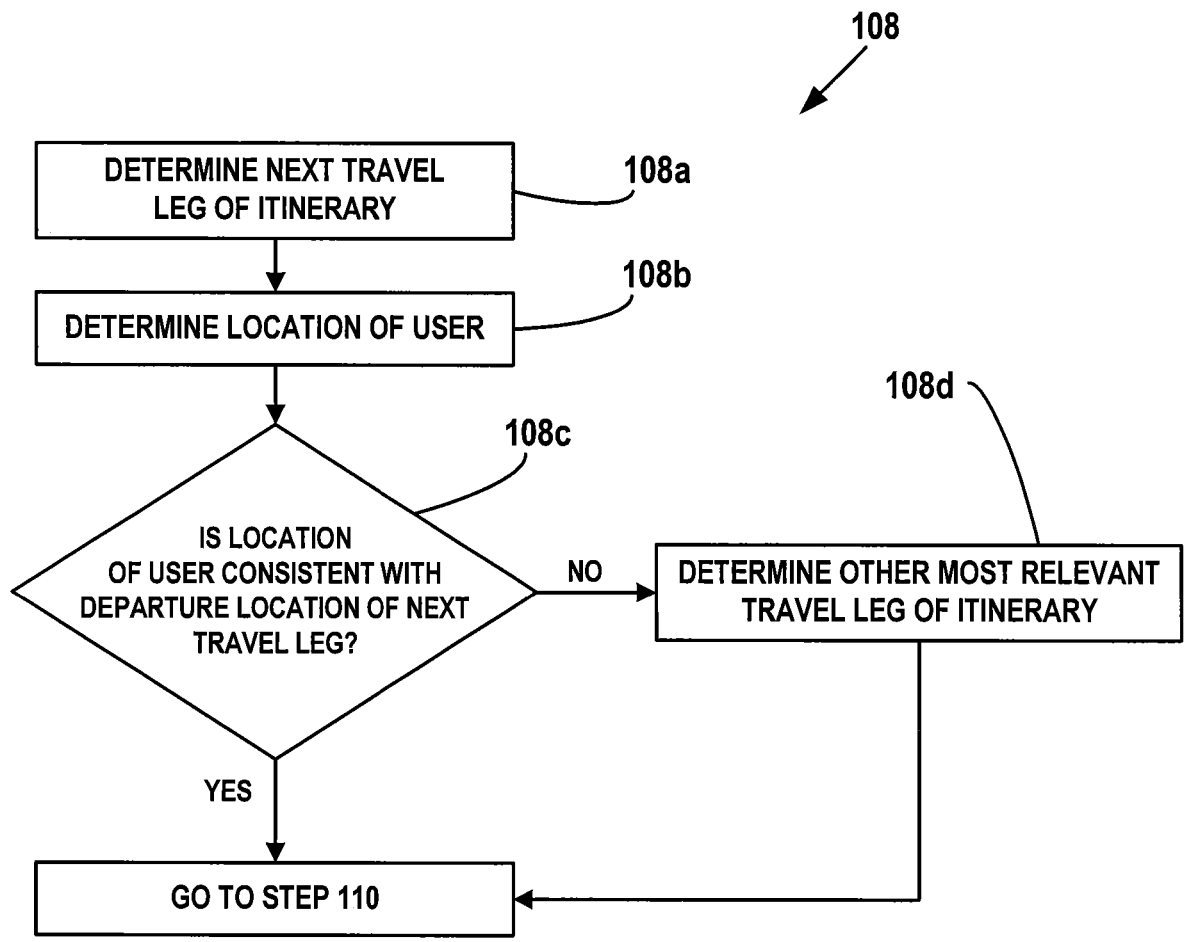
FIG. 10 a flow chart illustration of a step of the method of FIG. 9, according to an exemplary embodiment.

In an exemplary embodiment, as illustrated in FIG. 10 with continuing reference to FIGS. 1-9, to determine which travel leg of the user's travel itinerary to display in the step 108, the next travel leg of the travel itinerary is determined in step 108*a*, the location of the user is determined in step 108*b*, and it is determined in step 108*c* whether the location determined in the step 108*b* is consistent with the departure location of the next travel leg determined in the step 108*a*.

The next travel leg is determined in the step 108*a* by determining which travel legs of the travel itinerary have already been completed or are otherwise no longer applicable, and then identifying the next-in-time travel leg, that is, the first travel leg that will occur subsequent to the travel legs that have been determined to be completed or are otherwise no longer applicable. In an exemplary embodiment, the application 22 may determine that an airline flight, which constitutes part of the travel itinerary, has already departed, is in flight, or has arrived at its destination, thus determining that that part of the travel itinerary has been completed or is no longer applicable. In an exemplary embodiment, the application 22 may determine that the current time is past the occurrence of the departure or arrival of one or more airline flights, which constitute a part of the travel itinerary, thus determining that the airline flights have been completed or are no longer applicable.

In an exemplary embodiment, the application 22 determines the location of the user in the step 108*b* by communicating with the receiver 44, which provides the location of the portable user device 18 and thus the location of the user thereof. The receiver 44 determines the location of the portable device 18 by communicating with the satellite navigation system 26. In an exemplary embodiment, the application 22 determines whether the location of the user is consistent with the departure location of the next travel leg in the step 108*c* by determining whether the location of the user is at, near, or traveling to, the departure location.

In an exemplary embodiment, the application 22 determines the location of the user in the step 108*b*, and determines whether the location of the user is consistent with the departure location of the next travel leg in the step 108*c*, using geofencing. In particular, the application 22 communicates with the receiver 44, which provides the location of the portable user device 18 and thus the location of the user thereof by communicating with the satellite navigation system 26. The application 22 then determines, and/or communicates with the application server 12 to determine, whether the location of the user is within a geographic area having a defined perimeter, the coordinates of which are stored, in several exemplary embodiments, in the computer readable medium 38 of the portable device 18 and/or the computer readable medium 14 of the application server 12. The coordinates of the defined perimeter may correspond to the boundaries of the airport from which the second travel leg is to depart, and/or a wider area (such as a city, region or state) surrounding the airport.

As shown in FIG. 10, if it is determined in the step 108*c* that the location of the user is consistent with the departure location of the next travel leg, then the next travel leg of the travel itinerary identified in the step 108*a* is determined to be the travel leg to display and the step 110 of the method 106 is then executed. If it is determined in the step 108*c* that the location of the user is not consistent with the departure location of the next travel leg, then the other most relevant travel leg of the travel itinerary is determined in step 108*d*, and the other most relevant travel leg is determined to be the travel leg to display. In an exemplary embodiment, the other most relevant travel leg is determined in the step 108*d* by determining the travel leg having the departure location that is closest to the location of the user. In an exemplary embodiment, if the user has missed his or her airline flight and thus is still at the departure location of the travel leg that is completed or is no longer applicable (i.e., the missed airline flight), then in the step 108d an alternative airline flight occurring in the future and having the same departure and arrival locations as the missed airline flight is identified, thereby determining the other most relevant travel leg of the itinerary.

In an exemplary embodiment, to determine in the step 110 whether the user has checked in, the application 22 determines whether the user has checked in with the commercial airline for the travel leg determined to be displayed in the step 108. To execute the step 110, the application 22 accesses data stored in the computer readable medium 38, and/or communicates with the application server 12 to access data stored in the computer readable medium 14 and/or the engine 28.

In an exemplary embodiment, to determine in the step 112 whether the user has obtained a boarding pass, the application 22 determines whether the user has obtained a boarding pass for the travel leg determined to be displayed in the step 112. To execute the step 112, the application 22 accesses data stored in the computer readable medium 38, and/or communicates with the application server 12 to access data stored in the computer readable medium 14 and/or the engine 28.

Figure 11:
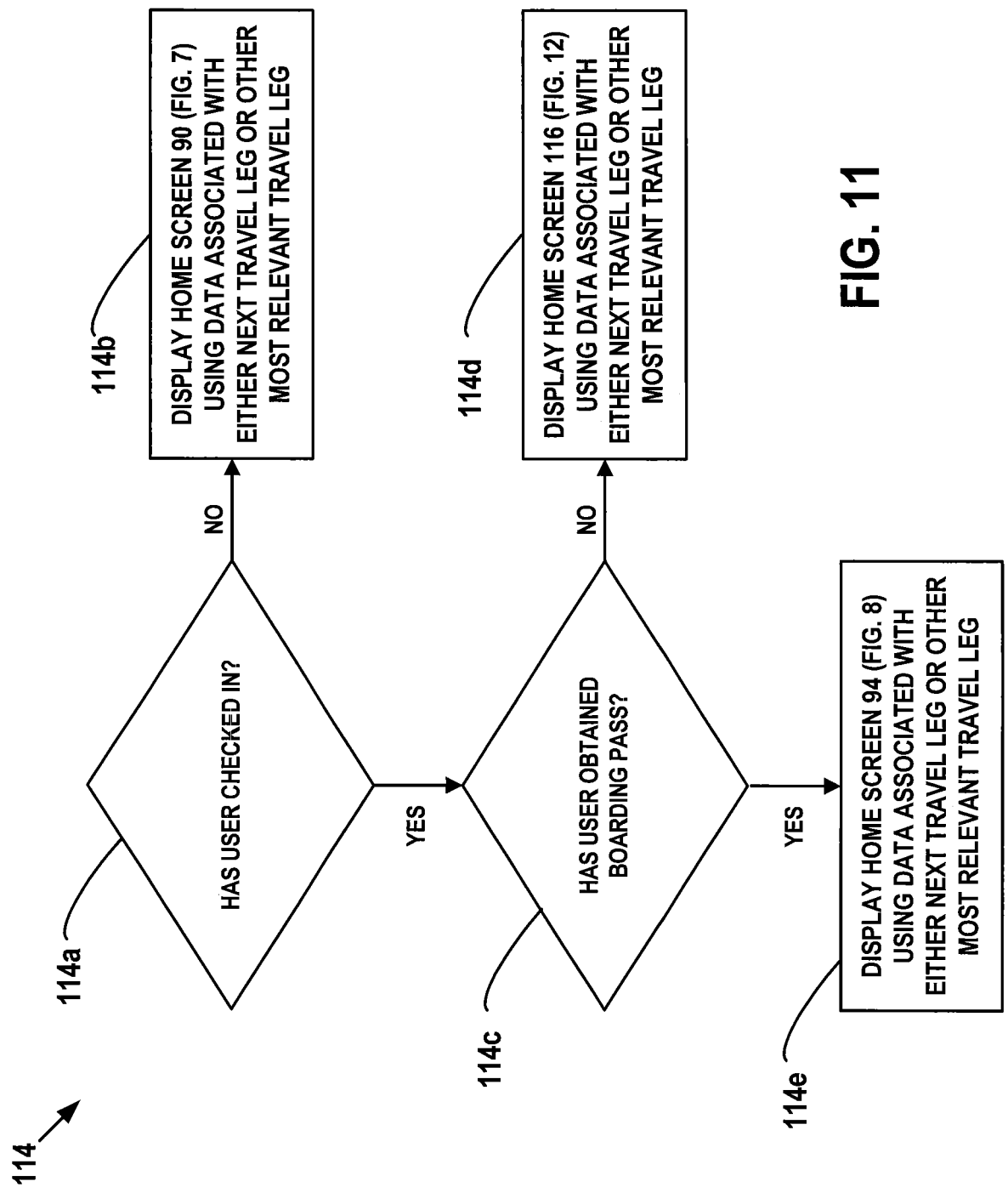
FIG. 11 is a flow chart illustration of another step of the method of FIG. 9, according to an exemplary embodiment.
Figure 12:
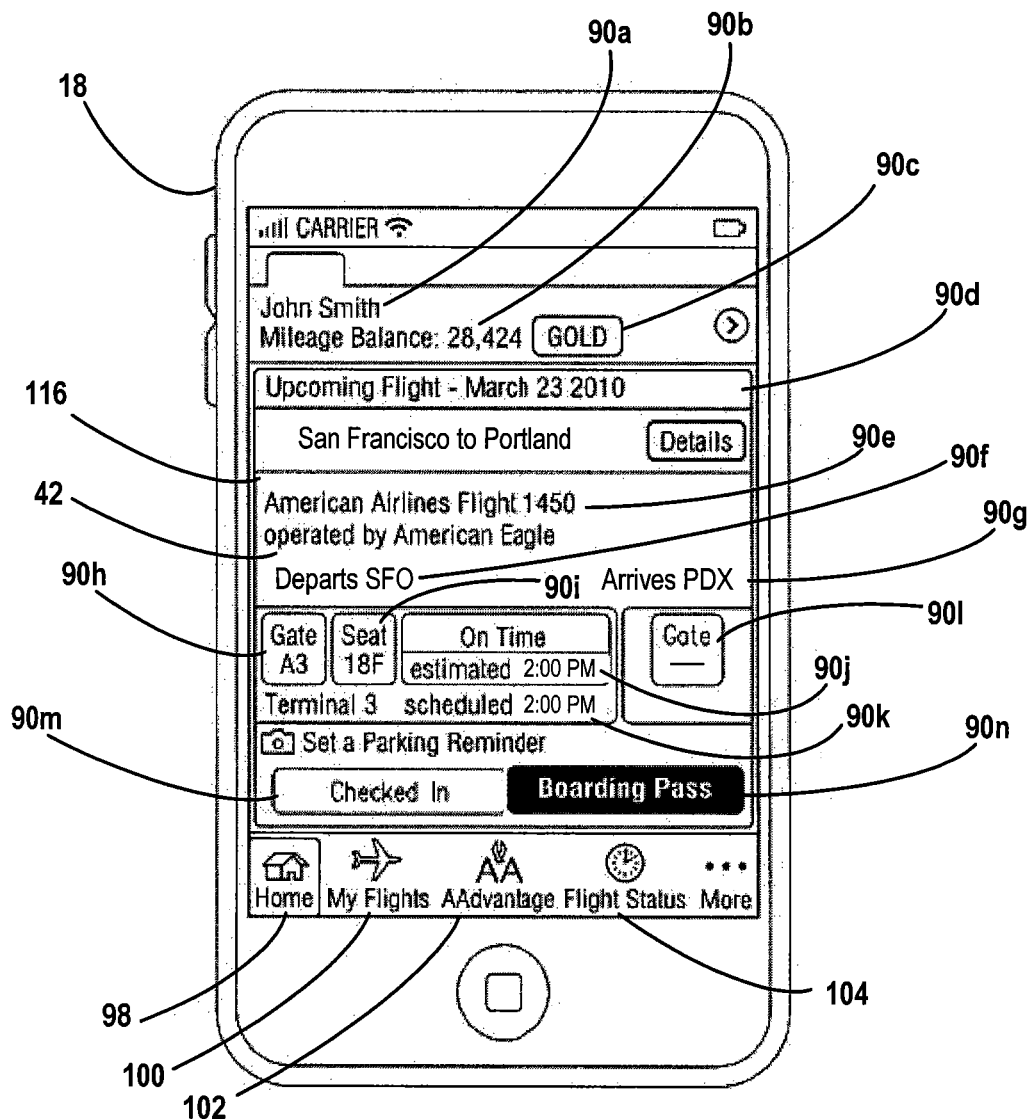
FIG. 12 is a diagrammatic illustration of a home screen displayed on the portable user device during the method of FIG. 9, according to an exemplary embodiment.

In an exemplary embodiment, as illustrated in FIGS. 11 and 12 with continuing reference to FIGS. 1-10, to automatically display in the step 114 a home screen on the portable user device 18 in accordance with the determinations made in the steps 108, 110 and 112, it is determined in step 114a whether the user has checked in and, if not, then the home screen 90 (FIG. 7) is automatically displayed on the multi-touch screen 42 of the device 18 in step 114b, with the home screen 90 displaying data associated with either the next travel leg determined or identified in the step 108a or the other most relevant travel leg determined or identified in the step 108d. As shown in FIG. 7, by highlighting the button 90m, the home screen 90 indicates that the button 90m may be selected by the user to give the user an opportunity to check in. However, as also shown in FIG. 7, by not highlighting the button 90n, the home screen 90 indicates that the button 90n may not be selected and thus the user may not obtain a boarding pass because the user has not yet checked in.

If the user has checked in, then it is determined in step 114c whether the user has obtained a boarding pass and, if not, then a home screen 116 (FIG. 12) is automatically displayed on the multi-touch screen 42 of the device 18 in step 114d, with the home screen 116 displaying data associated with either the next travel leg determined or identified in the step 108a, or the other most relevant travel leg determined or identified in the step 108d. As shown in FIG. 12, the home screen 116 is substantially similar to the home screen 90, except that the button 90m is not highlighted and instead the button 90n is highlighted, indicating that the button 90m may not be selected but that the button 90n may be selected and thus the user may obtain a boarding pass because the user has indeed checked in. In an exemplary embodiment, the boarding pass may be in the form of a display on the multi-touch screen 42 of the device 18, and the user may show the display to a gate agent, who scans the display to record the user's boarding of the aircraft. In an exemplary embodiment, the boarding pass may be stored by the application 22 in the computer readable medium 38, and the application 22 may permit the user to access the boarding pass at a later time, e.g., when the user is boarding the aircraft used by either the next travel leg or the other most relevant travel leg.

If the user has checked in and obtained a boarding pass, then the home screen 94 (FIG. 8) is automatically displayed on the multi-touch screen 42 of the device 18 in step 114e, with the home screen 94 displaying data associated with either the next travel leg determined or identified in the step 108a, or the other most relevant travel leg determined or identified in the step 108d. As shown in FIG. 8, neither the button 90m nor the button 90n is highlighted, indicating that neither the button 90m nor the button 90n may be selected because the user has already checked in and has already obtained a boarding pass.

Figure 13:
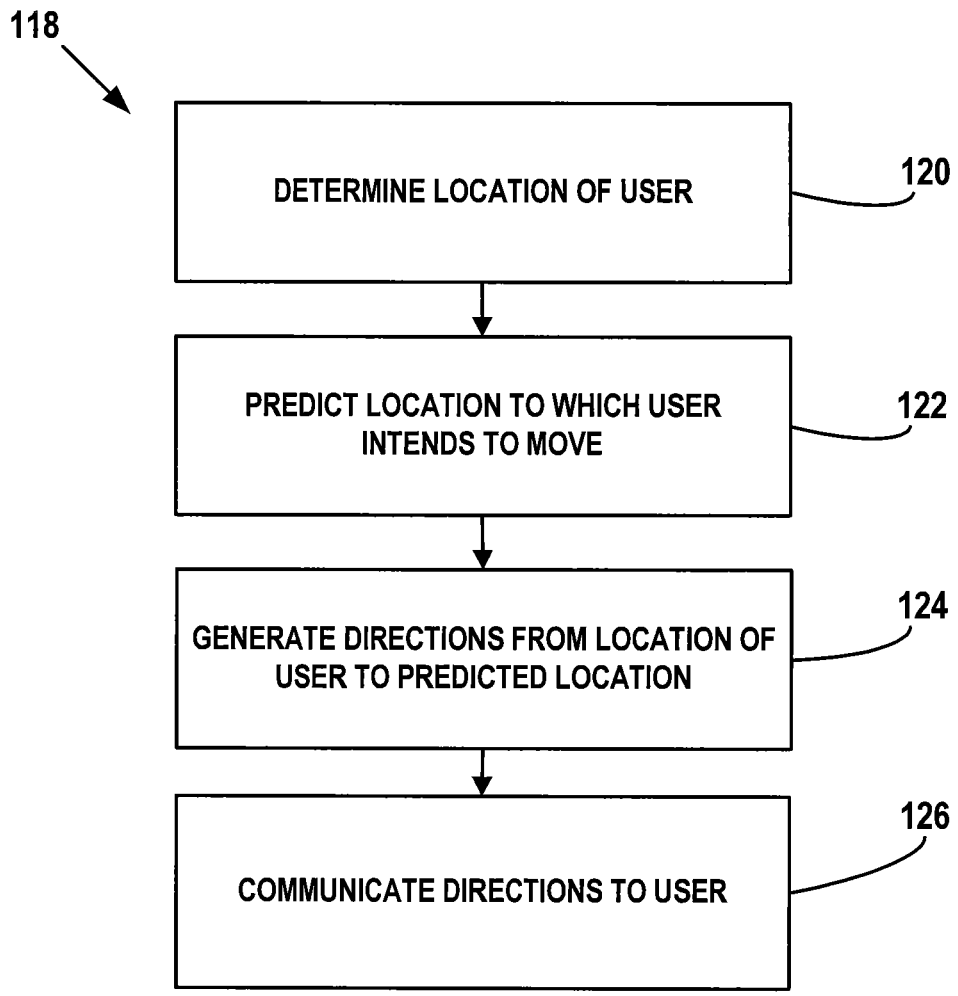
FIG. 13 is a flow chart illustration of a method of operating the system of FIG. 1, according to an exemplary embodiment.

In an exemplary embodiment, as illustrated in FIG. 13 with continuing reference to FIGS. 1-12, a method of operating the system 10 is generally referred to by the reference numeral 118 and includes determining the location of the user of the portable user device 18 in step 120, predicting the location to which the user intends to move in step 122, generating directions from the determined location of the user to the predicted location in step 124, and communicating the directions to the user in step 126.

In an exemplary embodiment, to determine the location of the user in the step 120, the application 22 determines the location of the user by communicating with the receiver 44, which provides the location of the portable user device 18 and thus the location of the user thereof. The receiver 44 determines the location of the portable device 18 by communicating with the satellite navigation system 26.

In an exemplary embodiment, to predict the location to which the user intends to move in the step 122, the application 22 determines where the user needs to be in order to embark on either the next travel leg of the travel itinerary, or the other most relevant travel leg of the travel itinerary.

Figure 14:
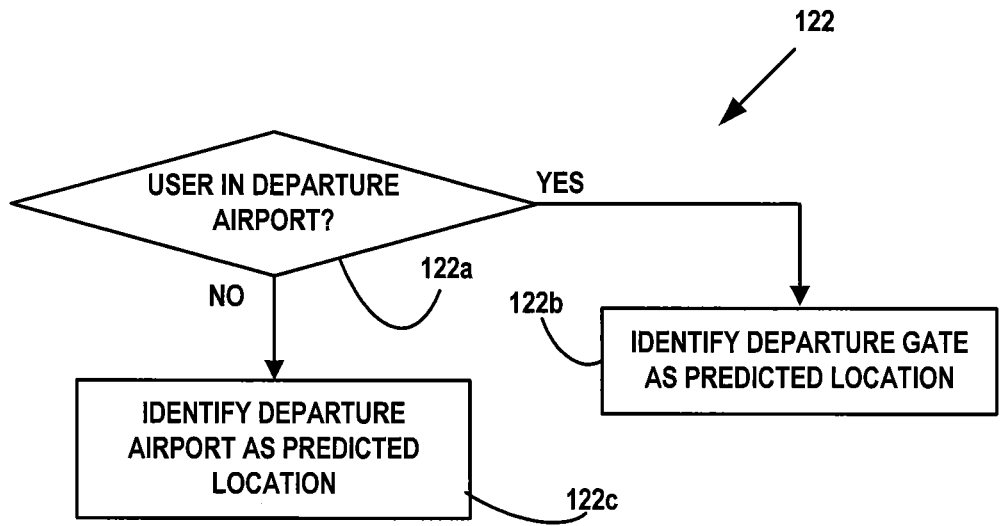
FIG. 14 is a flow chart illustration of a step of the method of FIG. 13, according to an exemplary embodiment.

In an exemplary embodiment, as illustrated in FIG. 14 with continuing reference to FIGS. 1-13, to predict the location to which the user intends to move in the step 122, the application 22 determines in step 122a whether the user is in the airport from which the next travel leg or the other most relevant travel leg will depart. If so, then the departure gate within the airport is identified as the predicted location in step 122b. If the user is not in the departure airport, then the departure airport is identified as the predicted location in step 122c.

In an exemplary embodiment, the application 22 executes the step 122a using geofencing. In particular, the application 22 communicates with the receiver 44, which provides the location of the portable user device 18 and thus the location of the user thereof by communicating with the satellite navigation system 26. The application 22 then determines, and/or communicates with the application server 12 to determine, whether the location of the user is within a geographic area having a defined perimeter, the coordinates of which are stored, in several exemplary embodiments, in the computer readable medium 38 of the portable device 18 and/or the computer readable medium 14 of the application server 12. The coordinates of the defined perimeter correspond to the boundaries of the airport from which the next travel leg or the other most relevant travel leg will depart.

Figure 15:
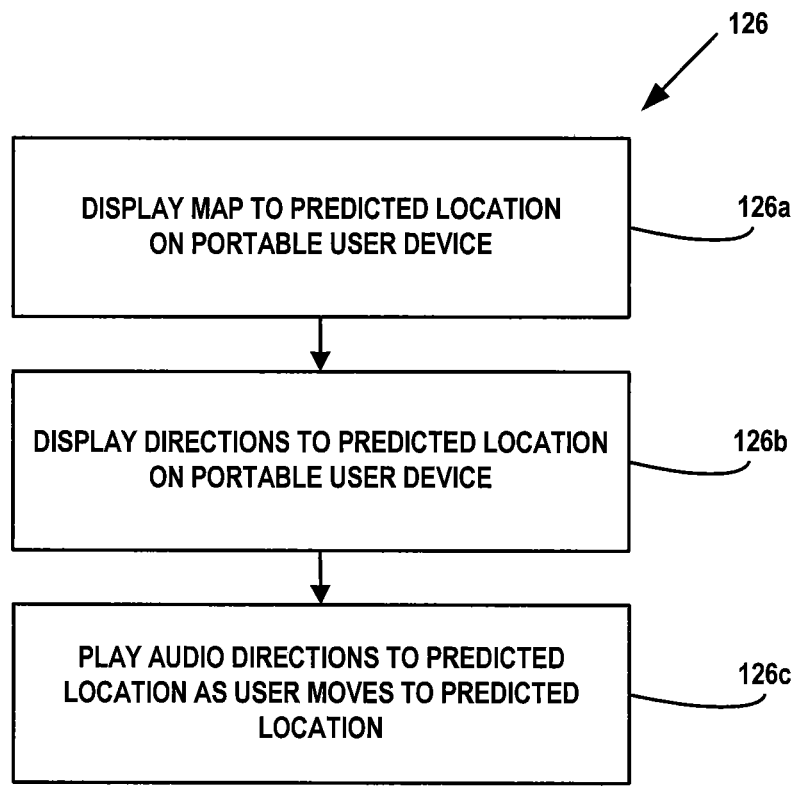
FIG. 15 is a flow chart illustration of another step of the method of FIG. 13, according to an exemplary embodiment.
Figure 16:
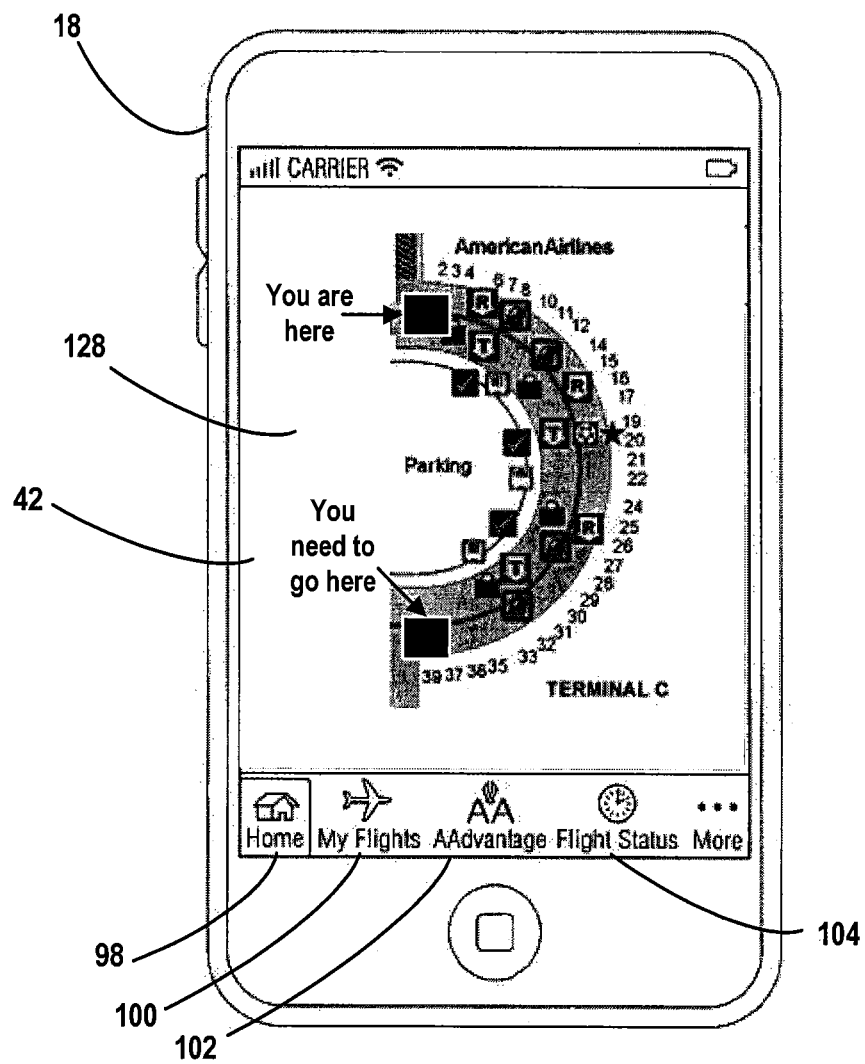
FIG. 16 is a diagrammatic illustration of a map displayed on the portable user device during the method of FIG. 13, according to an exemplary embodiment.

In an exemplary embodiment, as illustrated in FIGS. 15 and 16 with continuing reference to FIGS. 1-14, to communicate the directions to the user in the step 126, a map 128 to the predicted location (shown in FIG. 16) is displayed on the multi-touch screen 42 of the portable user device 18 in step 126a, step-by-step directions (turn right, go straight, turn left, continue straight, etc.) to the predicted location are displayed on the multi-touch screen 42 of the portable user device 18 in step 126b, and in step 126c, as the user moves to the predicted location, the portable user device 18 plays audio directions to the predicted location. As shown in FIG. 16, the map 128 is a map of an airport terminal and the predicted location is an airline gate C39. In an exemplary embodiment, in the step 126c, the portable user device 18 plays audio directions such as, for example, "Turn left now", "Gate C39 is on your left" or "Continue to Gate C39".

Figure 16A:
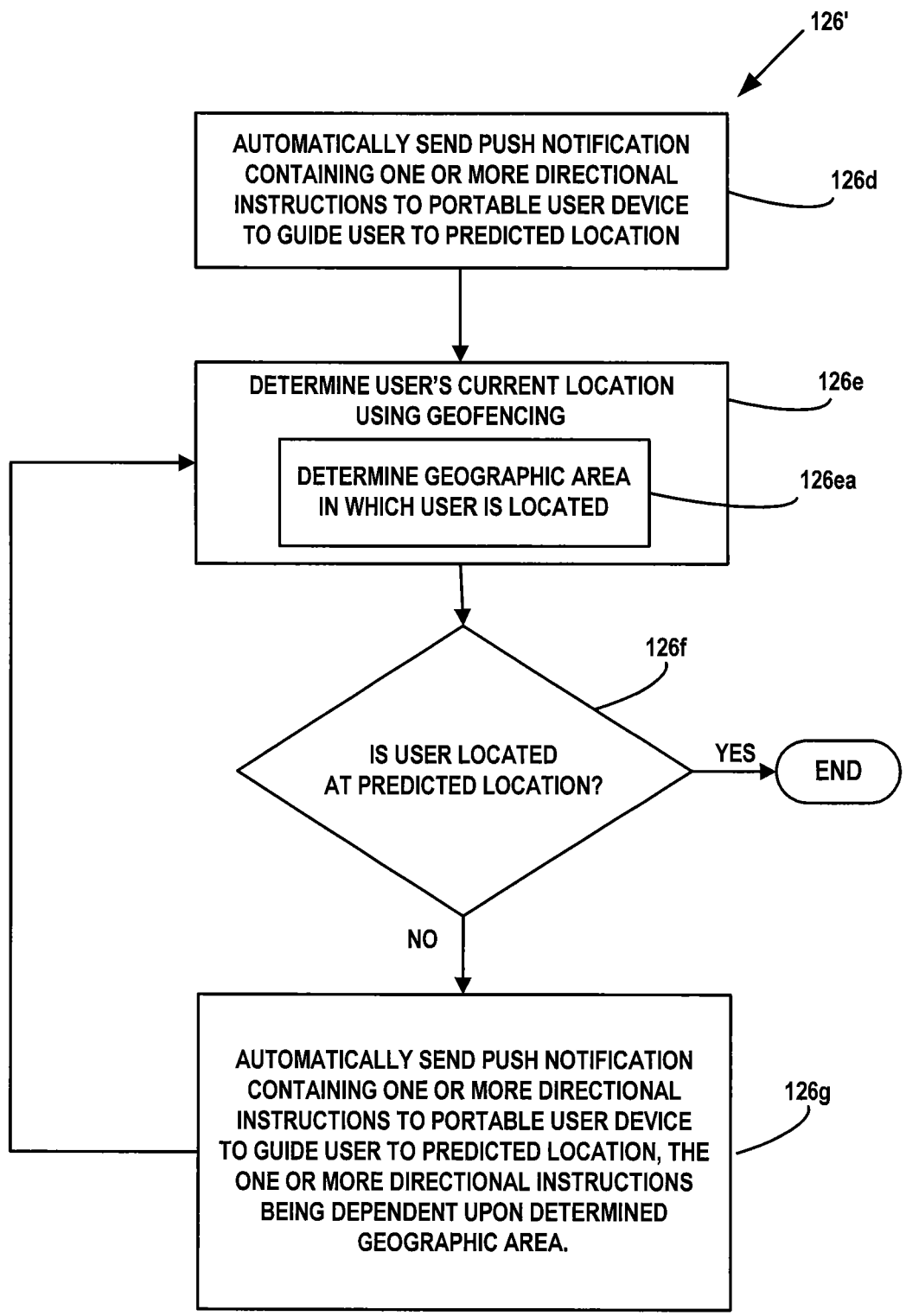
FIG. 16A is a flow chart illustration of the same step for which a flow chart is illustrated in FIG. 15, but according to a different exemplary embodiment.

In an exemplary embodiment, as illustrated in FIG. 16A with continuing reference to FIGS. 1-16, instead of, or in addition to the step 126, the method 118 includes a step 126'. The step 126' includes sending in step 126d a push notification containing one or more directional instructions to the portable user device 18 to guide the user to the location predicted in the step 122. In particular, the application server 12 sends a push message containing the one or more directional instructions to the push notification service 24. In an exemplary embodiment, the push message sent to the service 24 is specifically addressed to the portable user device 18 by using an identifier such as, for example, a device token generated by the service 24 within the application 22, but the application 22 sends the device token to the application server 12 for storage therein. In an exemplary embodiment, the push message sent to the service 24 in the step 140 includes the identifier, such as the device token, and the subject matter of the message. After receiving the message, the push notification service 24 pushes or sends the message to the portable user device 18. In several exemplary embodiments, in the step 126d, the one or more directional instructions may include, for example, "Take next exit to enter Airport, exit on your left", "Take next exit to Terminal C, exit on your right", "Elevators are to your right, take elevators down to second parking level to enter Terminal", "Turn left to Gate C39", etc.

As shown in FIG. 16A, after the step 126d, the user's current location is subsequently determined using geofencing in step 126e, which includes determining in step 126ea the geographic area in which the user is currently located. In particular, the user's location is compared with a plurality of sets of stored coordinates, each set corresponding to a geographic area such as, for example, a region outside of the airport from which the next travel leg or the other most relevant travel leg will depart, a roadway outside such airport, a roadway inside such airport, a parking lot inside such airport, a terminal inside such airport, a baggage claim area within a terminal inside such airport, a gate within a terminal of such airport, and/or any combination thereof. The geographic area determined in the step 126ea most specifically identifies the location in which the user is currently located. For example, a set of coordinates corresponds to a terminal, which is positioned in an airport for which another set of coordinates corresponds; if the user is currently located in the terminal, then in the step 126e the geographic area is determined to be the terminal, even though the user is also located in the airport. In several exemplary embodiments, additional sets of coordinates may specify three-dimensional coordinates and thus may correspond to other geographic areas specifying a vertical coordinate, rather than just horizontal coordinates; examples of such other geographic areas include, for example, specific floors or levels of a parking garage, specific floors or levels of a terminal, etc. As a result, in several exemplary embodiments, the geographic area in which the user is currently located is determined in the step 126ea using three-dimensional triangulation. In several exemplary embodiments, the step 126e may be executed at the expiration of a predetermined time period after the execution of the step 126d, and/or may be executed continuously, nearly continuously, or at predetermined time increments.

After the step 126e, it is determined in step 126f whether the user is located at the location predicted in the step 122. If so, then no more directional instructions are pushed to the portable user device 18. If not, then in step 126g another push notification containing one or more directional instructions is sent to the portable user device 18 to guide the user to the location predicted in the step 122. In the step 126g, the one or more directional instructions are dependent upon the geographic area determined in the step 126ea. In several exemplary embodiments, the one or more directional instructions in the step 126g may include, for example, "Take escalator up to second level and board tram", "Take escalator down to first level", "Gate C39 is on your right", etc. In several exemplary embodiments, the one or more directional instructions in the step 126g may include information regarding whether a parking lot is full, and/or the degree to which a parking lot if full. For example, the one or more directional instructions in the step 126g may include "Parking Lot A is full, proceed to Parking Lot B" or "Parking Lot A is 90% full".

The steps 126e, 126f and 126g are repeated until it is determined in the step 126f that the user is at the location predicted in the step 122, thereby providing turn-by-turn directions during the execution of the step 126. In several exemplary embodiments, the step 126e may be executed at the expiration of a predetermined time period after the execution of the step 126g, and/or may be executed continuously, nearly continuously, or at predetermined time increments. In several exemplary embodiments, by executing the step 126, the application 22 provides or otherwise enables the user of the portable user device 18 to benefit from a location based service (LBS).

In an exemplary embodiment, the method 118 may be executed in response to starting up or otherwise opening the application 22 on the portable user device 18, and/or the method 118 may be executed before, during and/or after the method 66, the method 106, and/or any combination thereof.

Figure 17:
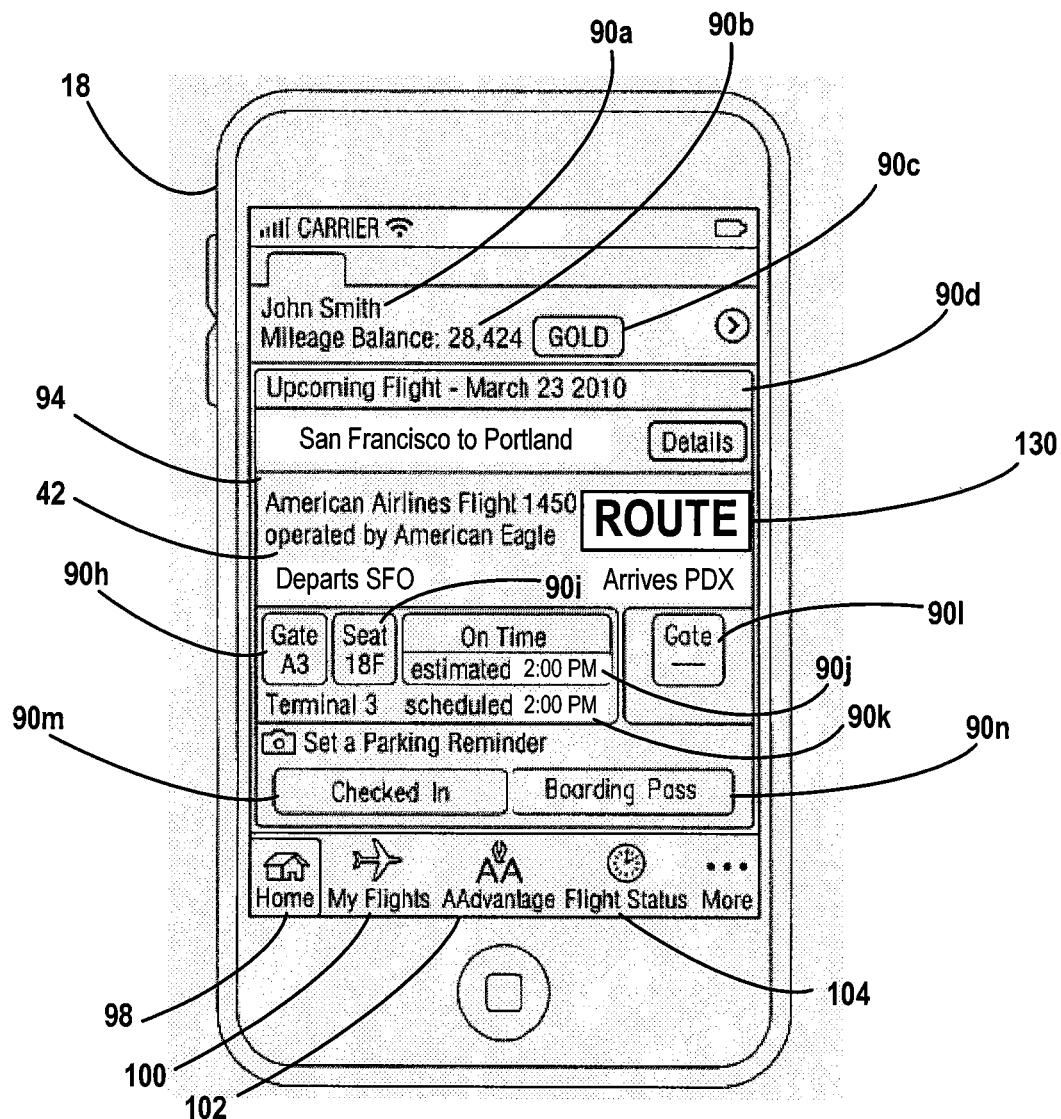
FIG. 17 is a diagrammatic illustration of a home screen displayed on the portable user during the method of FIG. 3, 9 or 13, according to an exemplary embodiment.

In an exemplary embodiment, the method 118 may be executed in response to the selection of a button or icon that is included in one of the home screens 72, 78, 84, 90 and 116. For example, as shown in FIG. 17, the home screen 94 includes a route button 130, the selection of which results in the execution of the method 118; if the user selects the button 130, the map 128 of FIG. 16 is displayed on the multi-touch screen 42 of the device 18.

Figure 17A:
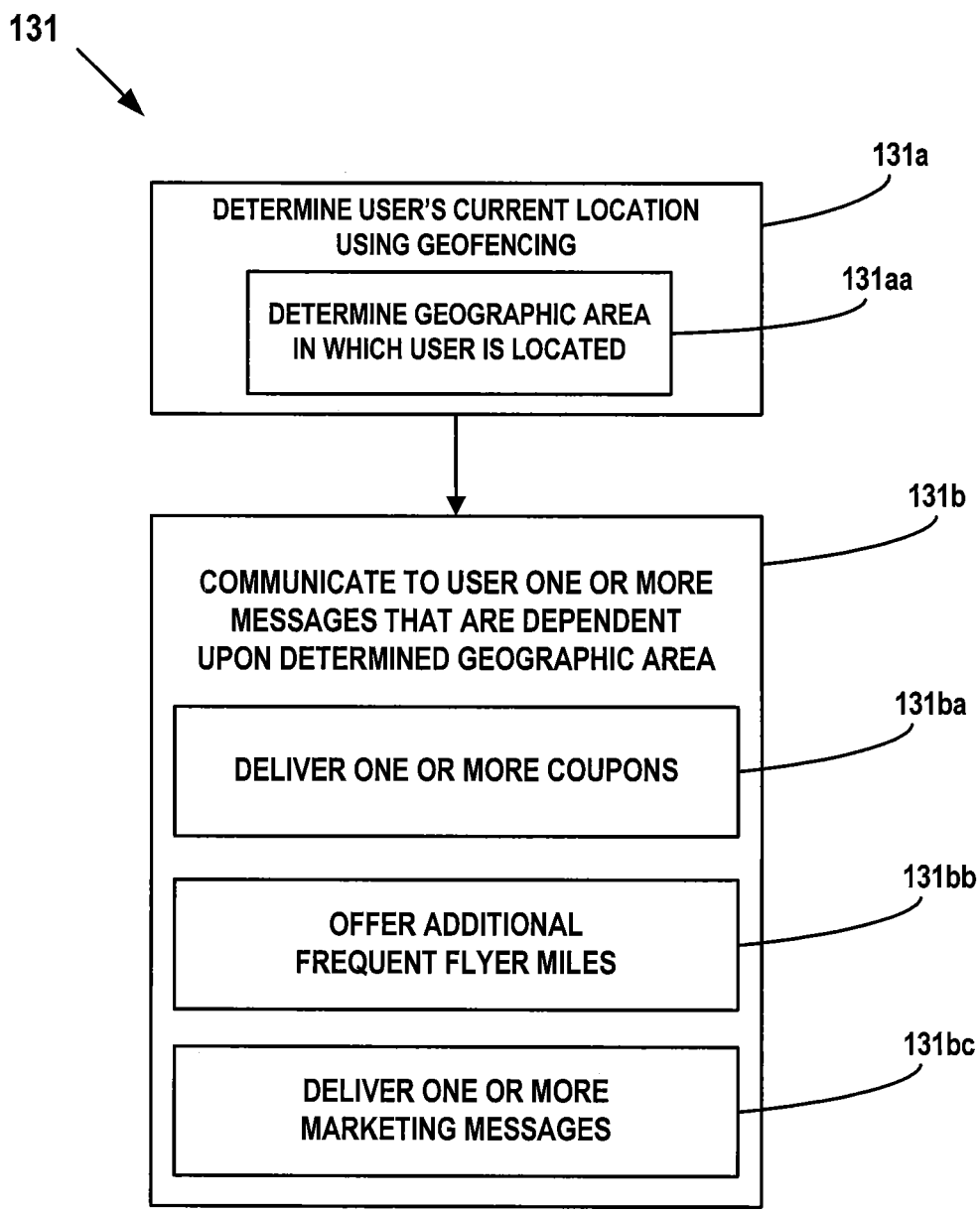
FIG. 17A is a flow chart illustration of a method of operating the system of FIG. 1, according to an exemplary embodiment.

In an exemplary embodiment, as illustrated in FIG. 17A with continuing reference to FIGS. 1-17, a method of operating the system 10 is generally referred to by the reference numeral 131 and includes determining the user's current location using geofencing in step 131a, which includes determined the geographic area in which the user is located in step 131aa. After the step 131a, one or more messages that are dependent upon the geographic area determined in the step 131aa are communicated to the user via the portable user device 18 in step 131b.

In an exemplary embodiment, the step 131a is identical to the step 126e described above and therefore the step 131 will not be described in further detail.

In an exemplary embodiment, to communicate the one or more messages in the step 131b, a server alert is triggered in response to the determination of the geographic area in the step 131aa, and the application server 12 detects the triggering of the server alert. The application server 12 sends a push message to the push notification service 24. After receiving the message, the push notification service 24 pushes or sends the message to the portable user device 18.

As shown in FIG. 17A, the step 131b may include one or more of the following: in step 131ba delivering one or more coupons for goods and/or services available for purchase in the determined geographic area; in step 131bb offering additional frequent flyer miles to the user of the portable user device 18 if, for example, the user changes his or her travel itinerary because the user's next travel leg is overbooked, or purchases goods and/or services available for purchase in the determined geographic area; and in step 131bc delivering one or more marketing messages that are dependent upon the geographic area such as, for example, advertisements for goods and services available for purchase in the geographic area.

In an exemplary embodiment, the method 131 may be executed in response to starting up or otherwise opening the application 22 on the portable user device 18, and/or the method 131 may be executed before, during and/or after the method 66, the method 106, the method 118, and/or any combination thereof.

Figure 18:
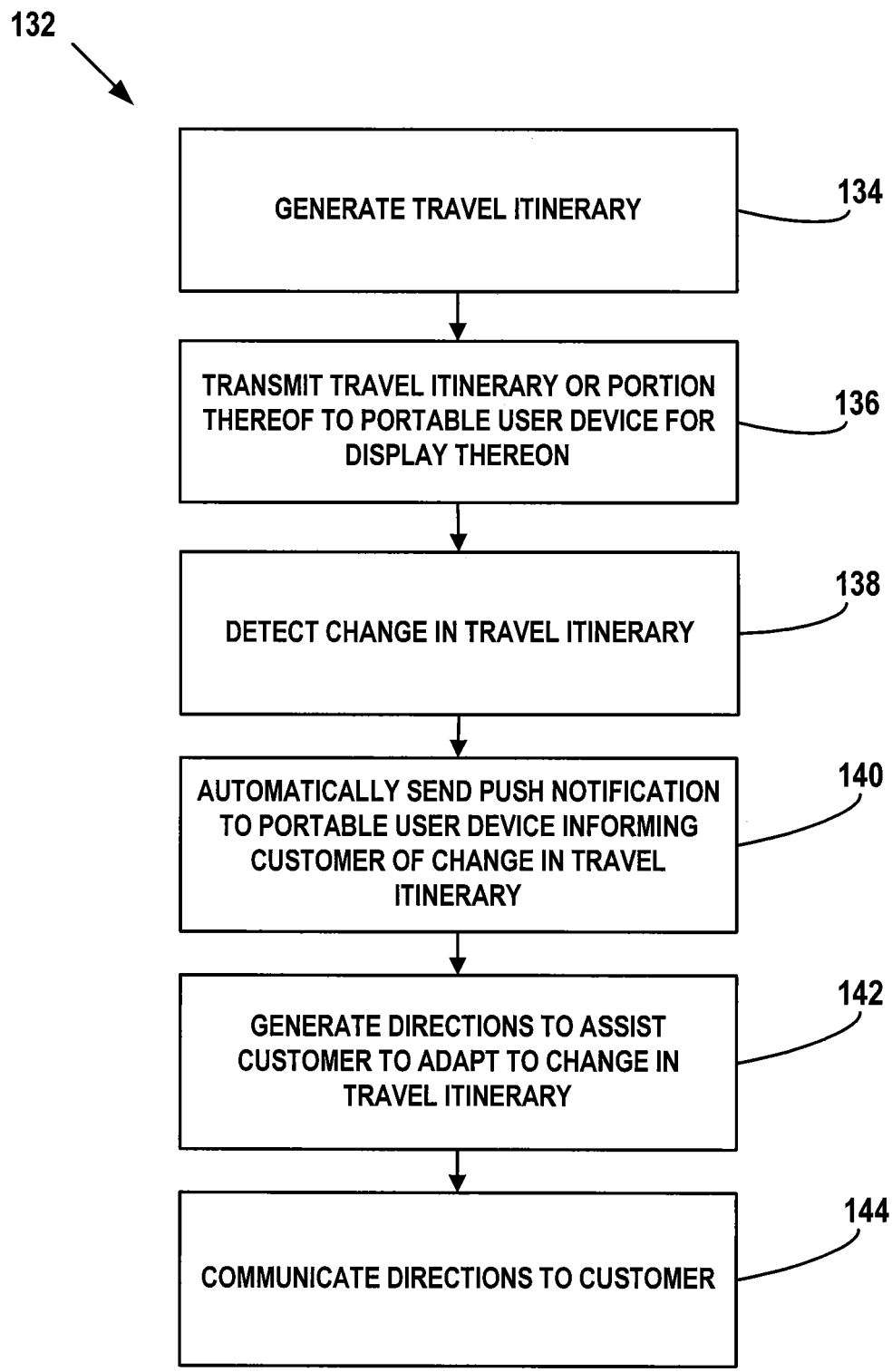
FIG. 18 is a flow chart illustration of a method of operating the system of FIG. 1, according to an exemplary embodiment.

In an exemplary embodiment, as illustrated in FIG. 18 with continuing reference to FIGS. 1-17, a method of operating the system 10 is generally referred to by the reference numeral 132 and includes generating a travel itinerary in step 134, transmitting the travel itinerary or a portion thereof to the portable user device 18 for display thereon in step 136, detecting a change in the travel itinerary in step 138, automatically sending a push notification to the portable user device 18 informing the user of the change in the travel itinerary in step 140, generating directions to assist the customer to adapt to the change in the travel itinerary in step 142, and communicating the directions to the user in step 144.

In an exemplary embodiment, to transmit the travel itinerary or a portion thereof to the portable user device 18 for display thereon in the step 136 of the method 132, the server 12 transmits the travel itinerary to the portable user device 18 via at least the network 20. In an exemplary embodiment, to display the travel itinerary or a portion thereof on the portable user device 18 in the step 136 of the method 132, the home screen 90, 94 or 116 is displayed on the multi-touch screen 42 of the portable user device 18.

In an exemplary embodiment, to automatically send a push notification to the portable user device 18 in the step 140 of the method 132, a server alert is triggered in response to the change in the travel itinerary, and the application server 12 detects the triggering of the server alert. The application server 12 sends a push message to the push notification service 24. The push message sent to the service 24 is configured to inform the user of the portable user device 18 of the change in the travel itinerary. In an exemplary embodiment, the push message sent to the service 24 is specifically addressed to the portable user device 18 by using an identifier such as, for example, a device token generated by the service 24 within the application 22, but the application 22 sends the device token to the application server 12 for storage therein. In an exemplary embodiment, the push message sent to the service 24 in the step 140 includes the identifier, such as the device token, and the subject matter of the message. After receiving the message, the push notification service 24 pushes or sends the message to the portable user device 18.

Figure 19:
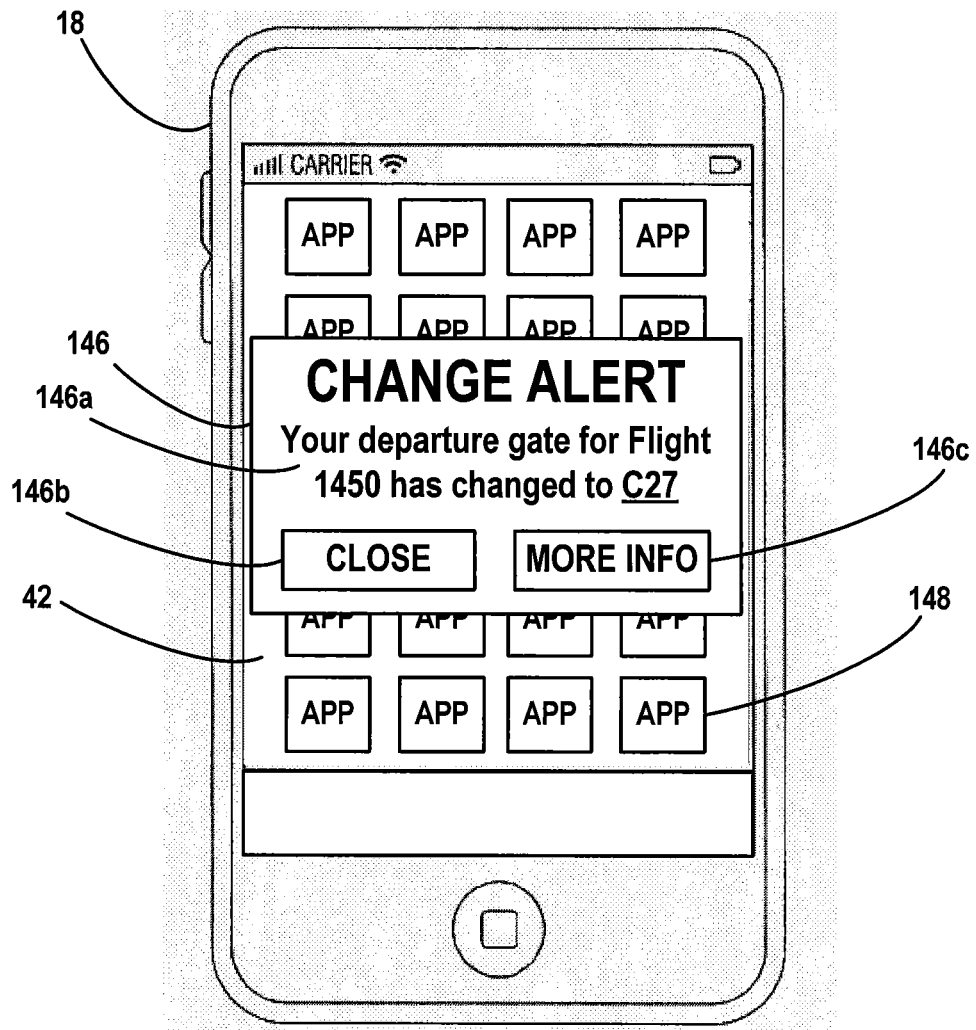
FIG. 19 is a diagrammatic illustration of a push notification displayed on the portable user device during the method of FIG. 18, according to an exemplary embodiment.

In an exemplary embodiment, as illustrated in FIG. 19 with continuing reference to FIGS. 1-18, as a result of the push notification service 24 pushing or sending the message to the portable user device 18, in the step 144 the application 22 automatically displays a pop-up box 146 on the multi-touch screen 42 of the device 18. The pop-up box 146 includes a message 146a informing the customer of the change in the travel itinerary, a close button 146b, and a more information button 146c. The selection of the close button 146b closes pop-up box 146 and thus the push notification. The selection of the button 146c opens the application 22 and provides additional details regarding the change in the travel itinerary. (As shown in FIG. 19, an icon 148 is displayed on the multi-touch screen 42; the selection of the icon 148 would execute, start up or open the application 22.)

In an exemplary embodiment, to generate directions in the step 142, directions are generated by the application 22 and/or the server 12 which assist the user to adapt to the change in the travel itinerary. For example, if the change in the travel itinerary is an airline departure gate change, the directions generated in the step 142 direct the user from the user's current location (in an exemplary embodiment determined by the application 22 in accordance with the foregoing) to the new airline departure gate location.

In an exemplary embodiment, to communicate to the user in the step 144 directions that assist the user to adapt to the change in the travel itinerary, the home screen 94 with the button 130 (FIG. 17) is displayed on the portable user device 18 in response to the selection of either the button 146c, which closes the push notification and opens the application 22, or the icon 148, which opens the application 22. In the step 144, after the application 22 is opened, a map reflecting the change in the travel itinerary is displayed on the multi-touch screen 42 of the portable user device 18, step-by-step directions (turn right, go straight, turn left, continue straight, etc.) reflecting the change in the travel itinerary are displayed on the multi-touch screen 42 of the portable user device 18, and/or the portable user device 18 plays audio directions to direct the user in how to adapt to the change in the travel itinerary. In an exemplary embodiment, in the step 144, the home screen 94 further includes the original message in the push notification.

In an exemplary embodiment, the method 132 may be executed in response to starting up or otherwise opening the application 22 on the portable user device 18, and/or the method 132 may be executed before, during and/or after the method 66, the method 106, the method 118, the method 131, and/or any combination thereof.

Figure 20:
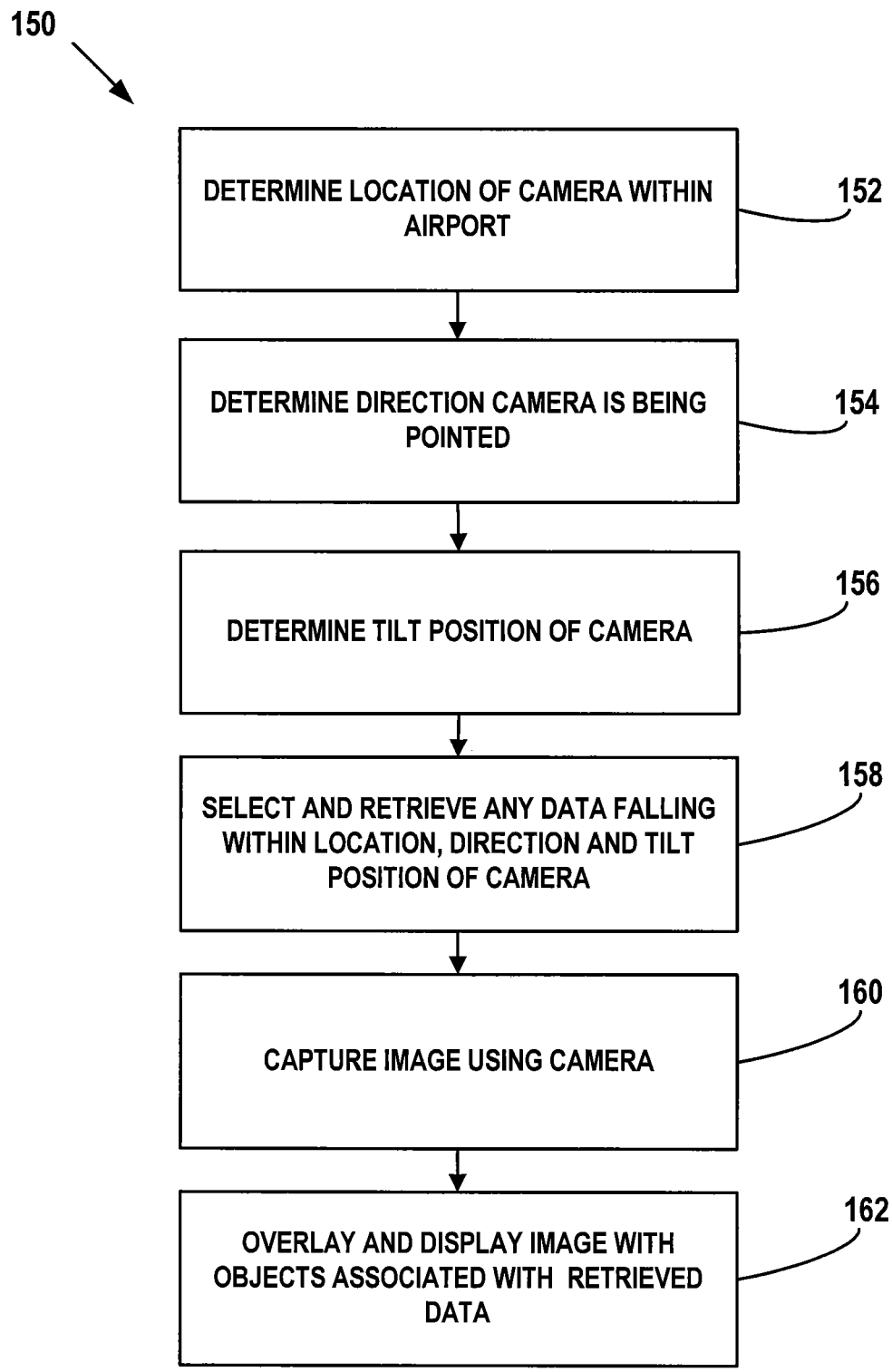
FIG. 20 is a flow chart illustration of a method of operating the system of FIG. 1, according to an exemplary embodiment.

In an exemplary embodiment, as illustrated in FIG. 20 with continuing reference to FIGS. 1-19, a method of operating the system 10 by providing augmented reality is generally referred to by the reference numeral 150. The method 150 includes determining the location of the device 18 and thus the camera 48 in step 152, determining the direction the camera 48 is being pointed in step 154, determining the tilt position of the camera 48 in step 156, selecting and retrieving data falling within the location, direction and tilt position of the camera 48, capturing an image using the camera 48, and overlaying and displaying the image with objects associated with the retrieved data in step 162, thereby augmenting the reality captured by the camera 48. In an exemplary embodiment, an augmented reality button is included in one of the home screens described above, and the selection of the button causes the application 22 to use the camera 48 and thus execute the method 150. In an exemplary embodiment, in the step 152, the application 22 determines the location of the device 18 and thus the camera 48 in accordance with the foregoing. In an exemplary embodiment, in the step 154, the application 22 uses the compass 46 to determine the direction the camera 48 is being pointed. In an exemplary embodiment, in the step 156, the application uses the tilt sensor 50 to determine the tilt position of the camera 48. In an exemplary embodiment, in the step 158, the application 22 selects and retrieves any data from the device 18 and/or the server 12 which falls within the location, direction and tilt position of the camera 48. That is, the application 22 selects and retrieves any data that is associated with any location that can be seen or is included in the image captured by the camera 48. For example, in the step 158, the application 22 may retrieve airline flight data associated with an airline gate that can be seen or is included in the image captured by the camera 48. For another example, in the step 158, the application may retrieve one or more directions associated with an airport feature that can be seen or is included in the image captured by the camera 48, such as data indicating that the user is to take an elevator and/or stairs to reach the airline gate from which the user's next travel leg will depart. For yet another example, in the step 158, the application may retrieve label data associated with additional airport features that can be seen or are included in the image captured by the camera 48, such as label data identifying restrooms, ticket agent counters, chapels, terminal exits, etc. In an exemplary embodiment, in the step 162, the application 22 overlays objects associated with the data retrieved in the step 158 over the image captured in the step 160, thereby augmenting the reality seen by the camera 48.

In an exemplary embodiment, the method 150 may be executed in response to starting up or otherwise opening the application 22 on the portable user device 18, and/or the method 150 may be executed before, during and/or after the method 66, the method 106, the method 118, the method 131, the method 132, and/or any combination thereof.

Figure 20A:
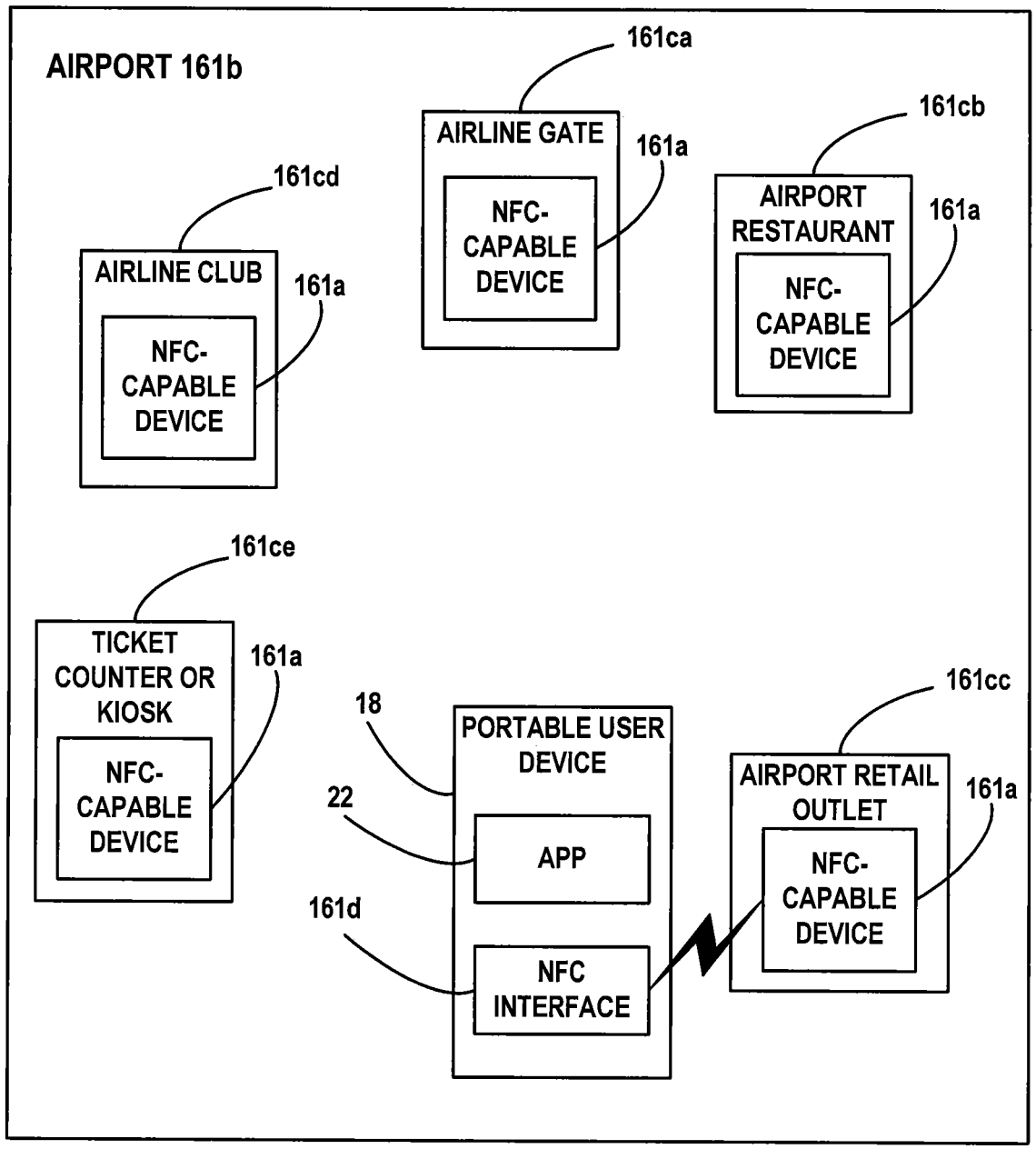
FIG. 20A is a diagrammatic illustration of a portion of the system of FIG. 1, the system including additional components, according to an exemplary embodiment.

In an exemplary embodiment, as illustrated in FIG. 20A with continuing reference to FIGS. 1-20, the system 10 further includes a plurality of external devices 161a, each of which has near field communication (NFC) capability. The external NFC-capable devices 161a are located at various outlets throughout an airport 161b such as, for example, at an airline gate 161ca, a restaurant 161cb, an airport retail outlet 161cc, an airport or airline lounge or club 161cd, airline ticket counter or kiosk 161ce, etc. The portable user device 18 further includes an NFC interface 161d, via which the portable user device 18 is capable of communicating with each of the external NFC-capable devices 161a.

In an exemplary embodiment, one or more of the NFC-capable devices 161a are NFC tags or readers. In an exemplary embodiment, one or more of the NFC-capable devices 161a may be in the form or kiosks. In an exemplary embodiment, one or more of the NFC-capable devices 161a may be characterized as "active" devices because the devices include their own respective power supplies and/or draw electrical power from external power supplies. In an exemplary embodiment, one or more of the NFC-capable devices 161a may be characterized as "passive" devices because the devices neither include their own respective power supplies nor draw electrical power from external power supplies; instead, the devices are powered via communication with the portable user device 18 via the NFC interface 161d. In an exemplary embodiment, each of the NFC-capable devices 161a is configured to communicate with the portable user device 18 via at least the NFC interface 161d.

In an exemplary embodiment, the NFC interface 161d includes an "active" transceiver circuit that is capable of communicating with one or more of the devices 161a. In an exemplary embodiment, the NFC interface 161d includes a power supply, and/or draws power from another power supply within the portable user device 18. In an exemplary embodiment, the NFC interface 161d is configured to permit communication between the portable user device 18 and each of the devices 161a at a relatively close range such as, for example, 2 to 4 cm. For example, as shown in FIG. 20A, the portable user device 18 is in relatively close proximity to, and thus is in communication with, the device 161a positioned at the airport retail outlet 161cc.

Figure 20B:
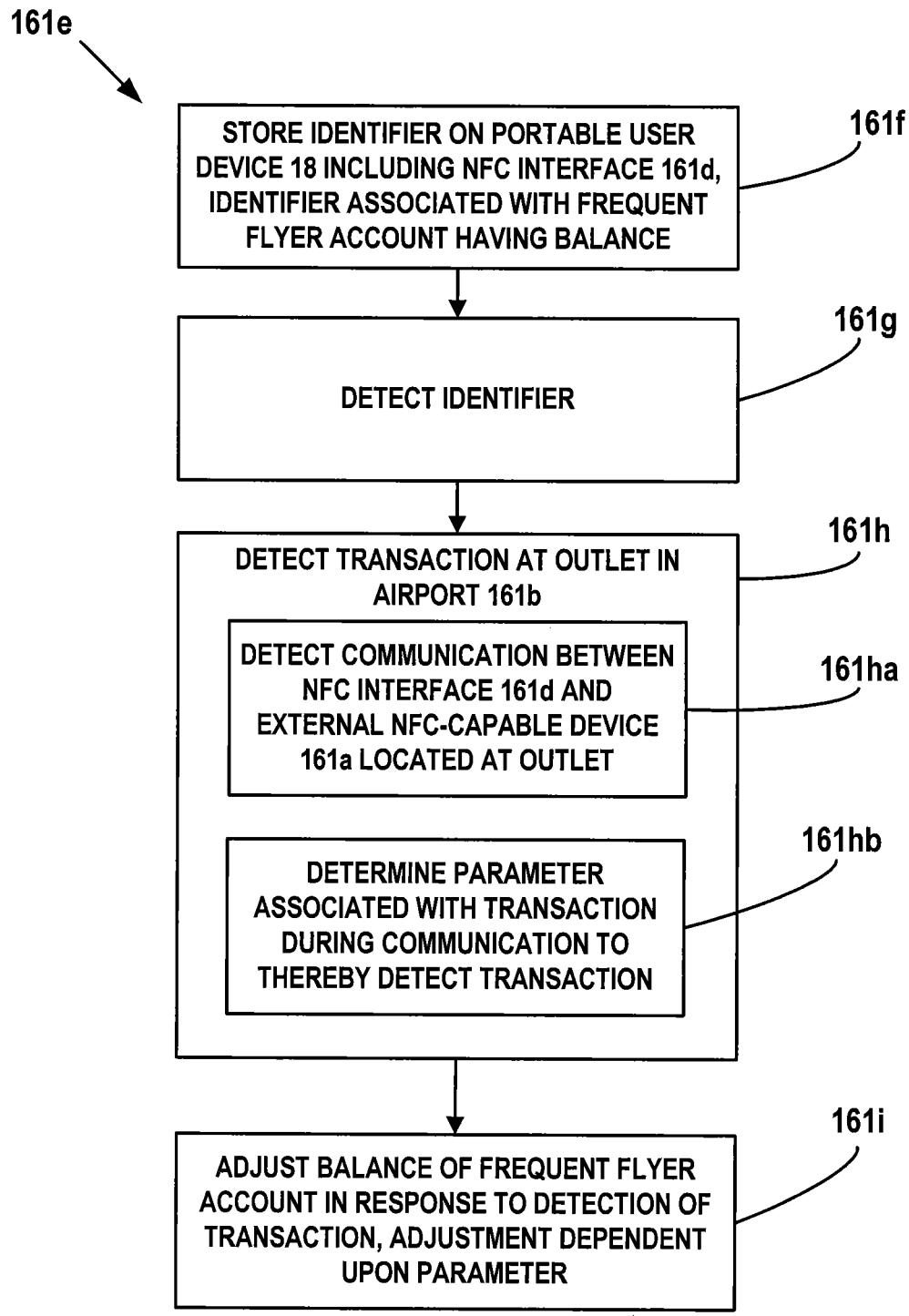
FIG. 20B is a flow chart illustration of a method of operating the system of FIGS. 1 and 20A, according to an exemplary embodiment.

In an exemplary embodiment, as illustrated in FIG. 20B with continuing reference to FIGS. 1-20A, a method of operating the system 10 using near field communication (NFC) is generally referred to by the reference numeral 161e. The method 161e includes storing in step 161f an identifier on the portable user device 18, the portable user device 18 including the NFC interface 161d. The identifier stored in the step 161f is associated with a frequent flyer account having a balance of frequent flyer miles. The identifier stored in the step 161f is detected using the application 22 in step 161g. At step 161h, a transaction at an outlet in the airport 161b such as, for example, one of the outlets 161ca, 161cb, 161cc and 161cd, is detected using the application 22. The step 161h includes detecting in step 161ha a communication between the NFC interface 161d and the corresponding external NFC-capable device 161a, and determining in step 161hb a parameter associated with the transaction during the communication to thereby detect the transaction. At step 161i, the balance of frequent flyer miles of the frequent flyer account associated with the identifier stored in the step 161f is adjusted in response to the detection of the transaction in the step 161hh, the adjustment being dependent upon the parameter determined in the step 161hb.

In an exemplary embodiment, at the step 161f the identifier may be stored in the computer readable medium 38 of the portable user device 18. In an exemplary embodiment, the identifier is assigned and stored on the portable user device 18 during the operation of the server 12 and its communication with the device 18 via the network 20. In an exemplary embodiment, the identifier is assigned and stored on the portable user device 18 in response to the user using the application 22 to open the frequent flyer account with which the identifier is associated. In an exemplary embodiment, the identifier is assigned and stored on the portable user device 18 in response to the user using the application 22 to initially login into the frequent flyer program and access his or her frequent flyer account. In an exemplary embodiment, the identifier includes one or more name-value pairs, one of which is a user identification (user ID).

In an exemplary embodiment, in addition to, or instead of, the step 161f, the identifier is stored in one or more of the computer readable medium 14 of the application server 12, the engine 28, and/or any combination thereof.

In an exemplary embodiment, to detect the stored identifier using the application 22 in the step 161g, the application 22 detects the stored identifier in response to the user opening, executing, running or otherwise starting up the application 22 on the portable user device 18.

In an exemplary embodiment, to detect the transaction at the outlet in the airport 161b at the step 161h, the steps 161ha and 161hb are executed. In an exemplary embodiment, to detect the communication between the NFC interface 161d and the external NFC-capable device 161a located at the outlet in the step 161ha, the user of the portable user device 18 first places the portable user device 18, and thus the NFC interface 161d, in relatively close physical proximity to one of the external NFC-capable devices 161a, thereby establishing a communication link therebetween. This communication link is detected in the step 161ha.

In an exemplary embodiment, before, during or after the detection of the communication link in the step 161*ha*, the user of the portable user device 18 conducts a transaction at the outlet at which the subject external NFC-capable device 161*a* is located. The transaction can be, for example, the user of the portable user device 18 departing from the airline gate 161*ca*, the user purchasing a good or service from the airport restaurant 161*cb*, the user purchasing a good or service from the airport retail outlet 161*cc*, the user entering the airline lounge or club 161*cd*, or the user being provided with a boarding pass at the airline ticket counter or kiosk 161*ce*. In an exemplary embodiment, the communication link established between the NFC interface 161*d* and the NFC-capable device 161*a* is used to initiate, process, complete and/or otherwise control the transaction at the outlet at which the device 161*a* is located. In an exemplary embodiment, the application 22 is used by the user to initiate, process, complete or otherwise control the transaction at the outlet at which the device 161*a* is located, and thus by doing so the application 22 detects the communication between the NFC interface 161*d* and the external NFC-capable device 161*a*.

In an exemplary embodiment, to determine the parameter associated with the transaction in the step 161*hb*, the application 22 determines the parameter during the communication between the NFC interface 161*d* and the external NFC-capable device 161*a*. In an exemplary embodiment, the parameter determined in the step 161*hb* can be permission to depart from the airline gate 161*ca*, the purchase of the good or service from the restaurant 161*cb*; the purchase of the good or service from the retail outlet 161*cc*; the cost to purchase the good or service from the restaurant 161*cb*; the cost to purchase the good or service from the retail outlet 161*cc*; permission to enter the club 161*cd*; and provision of a boarding pass at the airline ticket counter or kiosk 161*ce*.

In an exemplary embodiment, to adjust the balance of frequent flyer miles of the frequent flyer account in the step 161*i*, the application 22 adds frequent flyer miles to the balance of frequent flyer miles, subtracts frequent flyer miles from the balance of frequent flyer miles, and/or any combination thereof. The degree to which the balance of frequent flyer miles is adjusted in the step 161*i* is dependent upon the parameter determined in the step 161*hb*.

For example, with continuing reference to FIGS. 20A and 20B, the user of the portable user device 18 purchases t-shirts at the airport retail outlet 161*cc*. In one embodiment, to initiate, process and/or complete the purchase of the t-shirts, the user places the portable user device 18 in close proximity to the external NFC-capable device 161*a* located at the outlet 161*cc*. As a result of this placement, a communication link is established between the NFC interface 161*d* of the portable user device 18 and the NFC-capable device 161*a*. The application 22 detects the transaction of purchasing the t-shirts at the retail outlet 161*cc* in the step 161*h* by detecting the communication link (the step 161*ha*), and initiating, processing and/or completing the transaction of purchasing the t-shirts at the retail outlet 161*cc*, thereby determining in the step 161*hb* a parameter associated with the transaction such as, for example, the purchase of the t-shirts, the cost of the t-shirts, and/or any combination thereof. The balance of frequent flyer miles in the frequent flyer account associated with the identifier, which is detected in the step 161*g*, is adjusted in the step 161*i* by adding and/or subtracting frequent flyer miles to and/or from the balance of frequent flyer miles. The frequent flyer miles can be used as the "currency" or payment method to purchase the t-shirts, the parameter in the step 161*hb* can be the cost of the t-shirts, and the adjustment in the step 161*i* can be the subtraction of frequent flyer miles from the balance, the amount of subtracted frequent flyer miles being proportional to, and thus dependent upon, the cost of the t-shirts (the higher the cost, the larger the subtraction). In another embodiment, to initiate, process and/or complete the purchase of the t-shirts, conventional payment methods (cash, check, credit card, debit card, gift card, etc.) may be used to purchase the t-shirts. Before, during or after the purchase, the user places the portable user device 18 in close proximity to the external NFC-capable device 161*a*, which is part of, or in communication with, the cash register, point-of-sale terminal or other payment device used to initiate, process and/or complete the purchase. As a result of this placement, a communication link is established between the NFC interface 161*d* of the portable user device 18 and the NFC-capable device 161*a*. The application 22 detects the transaction of purchasing the t-shirts at the retail outlet 161*cc* in the step 161*h* by detecting in the step 161*ha* the communication link and determining in the step 161*hb* a parameter associated with the transaction such as, for example, the purchase of the t-shirts, the cost of the t-shirts, and/or any combination thereof. The adjustment in the step 161*i* can be the addition of frequent flyer miles to the balance, the amount of added frequent flyer miles being proportional to, and thus dependent upon, the cost of the t-shirts (the higher the cost, the larger the addition). As a result, the user is rewarded for shopping and purchasing items from the retail outlet 161*cc*.

For another example, with continuing reference to FIGS. 20A and 20B, the user of the portable user device 18 purchases food at the restaurant 161*cb*. In one embodiment, to initiate, process and/or complete the purchase of the food, the user places the portable user device 18 in close proximity to the external NFC-capable device 161*a* located at the restaurant 161*cb*. As a result of this placement, a communication link is established between the NFC interface 161*d* of the portable user device 18 and the NFC-capable device 161*a*. The application detects the transaction of purchasing the food at the restaurant 161*cb* in the step 161*h* by detecting the communication link (the step 161*ha*), and initiating, processing and/or completing the transaction of purchasing the food at the restaurant 161*cb*, thereby determining in the step 161*hb* a parameter associated with the transaction such as, for example, the purchase of the food, the cost of the food, and/or any combination thereof. The balance of frequent flyer miles in the frequent flyer account associated with the identifier, which is detected in the step 161*g*, is adjusted in the step 161*i* by adding and/or subtracting frequent flyer miles to and/or from the balance of frequent flyer miles. The frequent flyer miles can be used as the "currency" or payment method to purchase the food, the parameter in the step 161*hb* can be the cost of the food, and the adjustment in the step 161*i* can be the subtraction of frequent flyer miles from the balance, the amount of subtracted frequent flyer miles being proportional to, and thus dependent upon, the cost of the food (the higher the cost, the larger the subtraction). In another embodiment, to initiate, process and/or complete the purchase of the food, conventional payment methods (cash, check, credit card, debit card, gift card, etc.) may be used to purchase the food. Before, during or after the purchase, the user places the portable user device 18 in close proximity to the external NFC-capable device 161*a*, which is part of, or is in communication with, the cash register, point-of-sale terminal or other payment device used to initiate, process and/or complete the purchase. As a result of this placement, a communication link is established between the NFC interface 161*d* of the portable user device 18 and the NFC-capable device 161*a*. The application 22 detects the transaction of purchasing the food at the restaurant 161*cb* in the step 161*h* by detecting in the step 161*ha* the communication link and determining in the step 161*hb* a parameter associated with the transaction such as, for example, the purchase of the food, the cost of the food, and/or any combination thereof. The adjustment in the step 161*i* can be the addition of frequent flyer miles to the balance, the amount of added frequent flyer miles being proportional to, and thus dependent upon, the cost of the food (the higher the cost, the larger the addition). As a result, the user is rewarded for buying food at the restaurant 161*cb*.

For yet another example, with continuing reference to FIGS. 20A and 20B, the user of the portable user device 18 enters the airline club 161*cd*. In one embodiment, to enter the airline club 161*cd*, a representative at the entrance of the airline club 161*cd* welcomes the user and instructs the user to place the portable user device 18 in close proximity to the external NFC-capable device 161*a* located at the entrance of the airline club 161*cd*. The user does so and, as a result of this placement, a communication link is established between the NFC interface 161*d* of the portable user device 18 and the NFC-capable device 161*a*. The application 22 detects the transaction of entering the airline club 161*cd* by detecting the communication link (the step 161*ha*) and recognizing that the user has been given permission to enter the airline club 161*cd*, thereby determining in the step 161*hb* the parameter associated with the transaction (entrance into the airline club 161*cd*). The balance of frequent flyer miles in the frequent flyer account associated with the identifier, which is detected in the step 161*g*, is adjusted in the step 161*i* by adding and/or subtracting frequent flyer miles to and/or from the balance of frequent flyer miles. The adjustment in the step 161*i* can be the subtraction of frequent flyer miles from the balance, the amount of subtracted frequent flyer miles being characterized as the entrance fee to enter the airline club 161*cd*. Alternatively, the adjustment in the step 161*i* can be the addition of frequent flyer miles to the balance, the amount of added frequent flyer miles being a reward for patronizing the airline club 161*cd*. In another embodiment, the portable user device 18 functions as a passkey, opening an otherwise locked door so that the user may enter the airline club 161*cd*.

For still yet another example, with continuing reference to FIGS. 20A and 20B, the user of the portable user device 18 presents his or her boarding pass to a gate agent at the airline gate 161*ca*. The gate agent scans the boarding pass and the user boards an airplane to depart from the airline gate 161*ca*. In one embodiment, to depart from the airline gate 161*ca*, the gate agent instructs the user to place the portable user device 18 in close proximity to the external NFC-capable device 161*a* located at the airline gate 161*ca*. The user does so and, as a result of this placement, a communication link is established between the NFC interface 161*d* of the portable user device 18 and the NFC-capable device 161*a*. The application 22 detects the transaction of departing from the airline gate 161*ca* by detecting the communication link (the step 161*ha*) and recognizing that the user has been given permission to depart from the airline gate 161*ca*, thereby determining in the step 161*hb* the parameter associated with the transaction (i.e., departure from the airline gate 161*ca*). The balance of frequent flyer miles in the frequent flyer account associated with the identifier, which is detected in the step 161*g*, is adjusted in the step 161*i* by adding and/or subtracting frequent flyer miles to and/or from the balance of frequent flyer miles. The adjustment in the step 161*i* can be the addition of frequent flyer miles to the balance, the amount of added frequent flyer miles being a reward for patronizing the airline. The amount of added frequent flyer miles may be proportional to and thus dependent upon, for example, the number of miles that the user is expected to fly after departing from the airline gate 161*ca*, the historical use of the airline by the user of the portable user device 18, etc. In another embodiment, the application 22 displays the boarding pass on the portable user device 18, and the gate agent scans the portable user device 18. In yet another embodiment, the scanner used to scan the boarding pass is, or is part of, the NFC-capable device 161*a* located at the airline gate 161*ca*, and the scanning of the boarding pass and the step 161*h* is accomplished simultaneously or nearly simultaneously in response to the user placing the portable user device 18 in close proximity to the NFC-capable device 161*a* located at the airline gate 161*ca*. In an exemplary embodiment, the foregoing is conducted without a gate agent and instead the user of the portable user device 18 interacts with a kiosk or other device.

For still yet another example, with continuing reference to FIGS. 20A and 20B, the user of the portable user device 18 checks in at the airline ticket counter or self-serve kiosk 161*ce*. The ticket agent or the kiosk 161*ce* provides a boarding pass to the user of the portable user device 18, either by paper or electronically using the application 22. In one embodiment, to receive the boarding pass, the user is directed to place the portable user device 18 in close proximity to the external NFC-capable device 161*a* located at the airline ticket counter or kiosk 161*ce*. The user does so and, as a result of this placement, a communication link is established between the NFC interface 161*d* of the portable user device 18 and the NFC-capable device 161*a*. The application 22 detects the transaction of receiving the boarding pass by detecting the communication link (the step 161*ha*) and recognizing that the user has been provided a boarding pass, thereby determining in the step 161*hb* the parameter associated with the transaction (i.e., provision of boarding pass). The balance of frequent flyer miles in the frequent flyer account associated with the identifier, which is detected in the step 161*g*, is adjusted in the step 161*i* by adding and/or subtracting frequent flyer miles to and/or from the balance of frequent flyer miles. The adjustment in the step 161*i* can be the addition of frequent flyer miles to the balance, the amount of added frequent flyer miles being a reward for patronizing the airline. The amount of added frequent flyer miles may be proportional to and thus dependent upon, for example, the number of miles that the user expects to fly on the flight for which the boarding pass has been provided, the historical use of the airline by the user of the portable user device 18, etc. In another embodiment, the self-serve device that provides the boarding pass is, or is part of, the NFC-capable device 161*a*, and the provision of the boarding pass and the step 161*h* is accomplished simultaneously or nearly simultaneously in response to the user placing the portable user device 18 in close proximity to the NFC-capable device 161*a*.

In an exemplary embodiment, the method 161*e* may be executed in response to starting up or otherwise opening the application 22 on the portable user device 18, and/or the method 161*e* may be executed before, during and/or after the method 66, the method 106, the method 118, the method 131, the method 132, the method 150, and/or any combination thereof.

Figure 21:
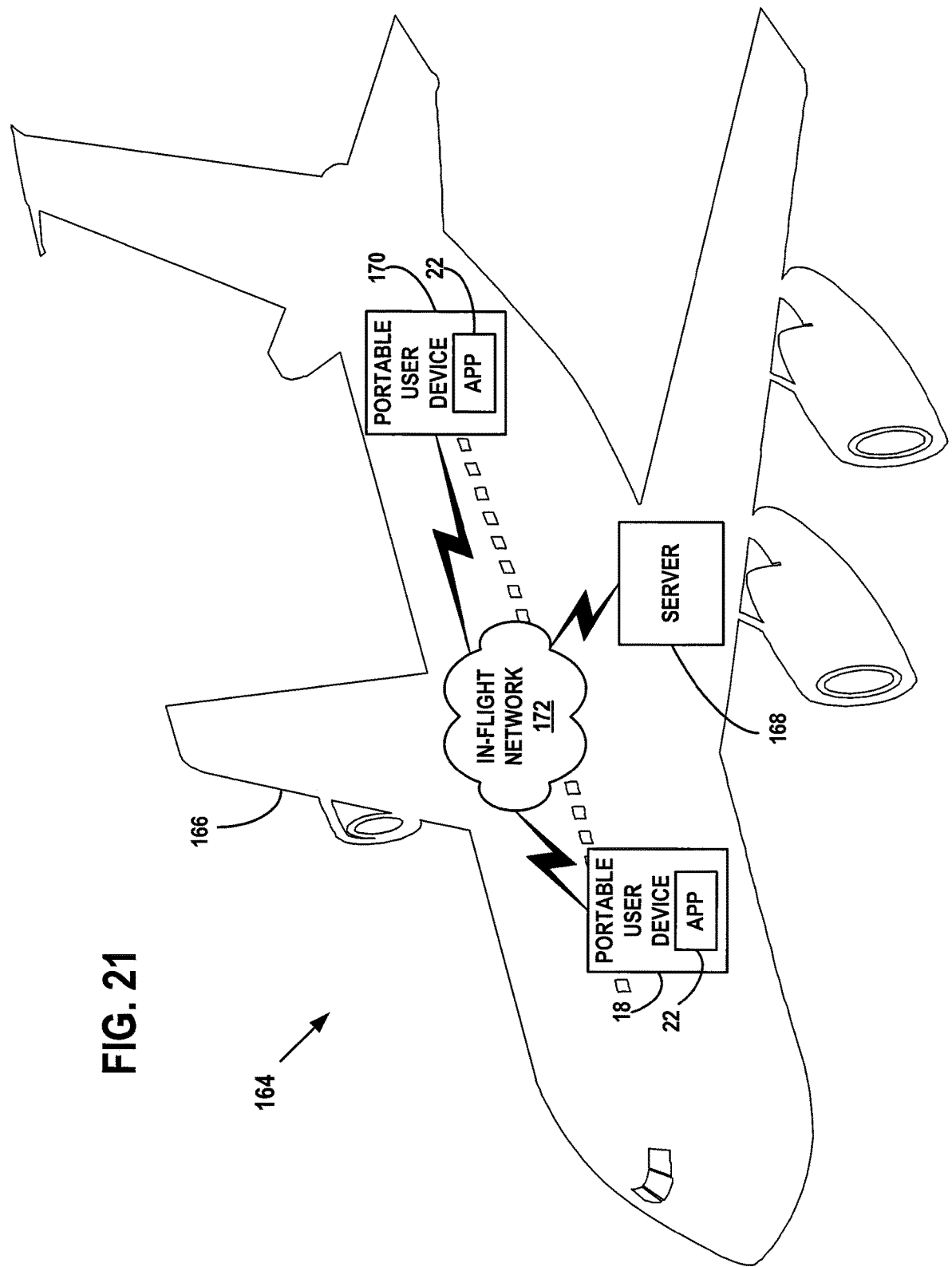
FIG. 21 is a diagrammatic illustration of a system according to an exemplary embodiment.

In an exemplary embodiment, as illustrated in FIG. 21 with continuing reference to FIGS. 1-20, a system is generally referred to by the reference numeral 164 and includes an airplane 166 and a server 168 located on the airplane 166. The portable user device 18 and at least one other portable user device 170 are operably coupled to, and in two-way communication with, the server 168 via a network 172. The users of the portable user devices 18 and 170 are passengers on the airplane 166. In an exemplary embodiment, the portable user device 170 is identical to the device 18, and also includes the application 22 loaded thereon. In an exemplary embodiment, the network 172 is an in-flight Wi-Fi network, and the server 168 manages the in-flight W-Fi network. In operation, in an exemplary embodiment, the users of the devices 18 and 170 can participate in activities using the application 22 over the network 172. In an exemplary embodiment, the activities are defined by the airplane 166 and/or the passengers traveling thereon and using the application 22. More particularly, in several exemplary embodiments, the system 164 provides airplane-wide game playing, message boards, discussion forums, and/or any combination thereof, using the application 22. For example, using the system 164, the user of the device 18 may use the application 22 to post a question on an electronic message board that is limited to the users of the devices 18 and 170 that are on the airplane 166; an example question may be: "This is my first time visiting [arrival location of the airplane 166]; can anyone recommend a good steakhouse?". And the user of the device 170 may use the application 22 to view the question and post an answer on the message board recommending a steakhouse.

In several exemplary embodiments, the application 22 is a trusted source to the server 168. Thus, the server 168 allows the user of the device 18 to connect to the network 172 when the user is on the airplane 166. In several exemplary embodiments, the user of the device 18 may use the application 22, via the network 172, to: swap airplane seats with other passengers on the airplane 166; bid on available seats on the airplane 166; upgrade to a different class of seats, such as first class, on the airplane 166; conduct peer gaming while on the airplane 166; view live media while on the airplane 166; execute multimedia applications while on the airplane 166; download movies and other types of content to the portable user device 18 for in-flight use and, in some embodiments, for home use after the flight has been completed; read an electronic version of an in-flight magazine while on the airplane 166 and, in some embodiments, after disembarking from the airplane 166; and/or any combination thereof.

Figure 22:
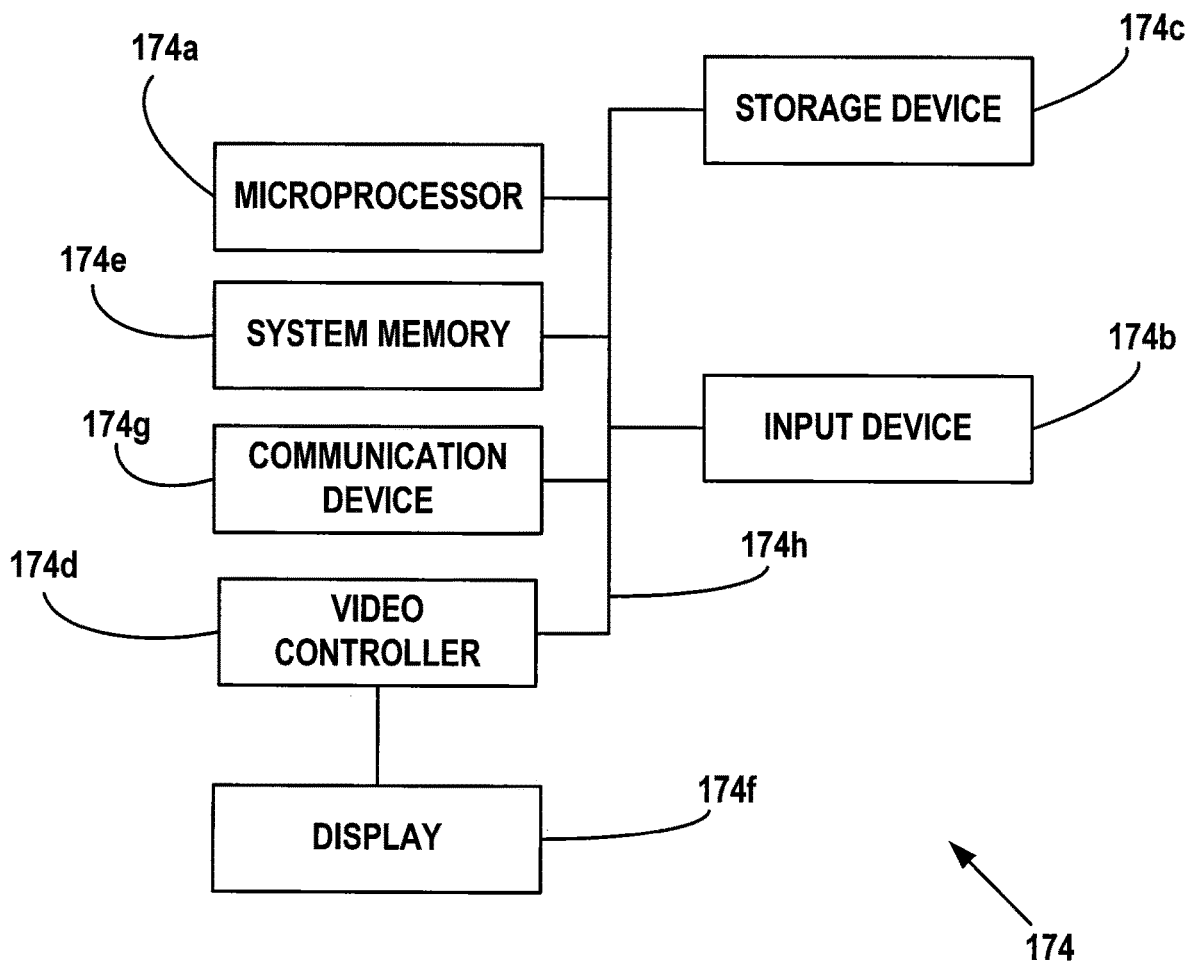
FIG. 22 is a diagrammatic illustration of a node for implementing one or more exemplary embodiments of the present disclosure, according to an exemplary embodiment.

In an exemplary embodiment, as illustrated in FIG. 22 with continuing reference to FIGS. 1-21, an illustrative node 174 for implementing one or more embodiments of one or more of the above-described networks, elements, methods and/or steps, and/or any combination thereof, is depicted. The node 174 includes a microprocessor 174*a*, an input device 174*b*, a storage device 174*c*, a video controller 174*d*, a system memory 174*e*, a display 174*f*, and a communication device 174*g* all interconnected by one or more buses 174*h*. In several exemplary embodiments, the storage device 174*c* may include a floppy drive, hard drive, CD-ROM, optical drive, any other form of storage device and/or any combination thereof. In several exemplary embodiments, the storage device 174*c* may include, and/or be capable of receiving, a floppy disk, CD-ROM, DVD-ROM, or any other form of computer readable medium that may contain executable instructions. In several exemplary embodiments, the communication device 174*g* may include a modem, network card, or any other device to enable the node to communicate with other nodes. In several exemplary embodiments, any node represents a plurality of interconnected (whether by intranet or Internet) computer systems, including without limitation, personal computers, mainframes, PDAs, smartphones and cell phones.

In several exemplary embodiments, one or more of the portable user devices 18, 60 and 170, the application server 12, the push notification service 24, the server 168, and the engine 28 is, or at least includes, the node 174 and/or components thereof, and/or one or more nodes that are substantially similar to the node 174 and/or components thereof. In several exemplary embodiments, one or more of the above-described components of one or more of the node 174, the portable user device 18, the application server 12, the push notification service 24, and the engine 28, include respective pluralities of same components.

In several exemplary embodiments, a computer system typically includes at least hardware capable of executing machine readable instructions, as well as the software for executing acts (typically machine-readable instructions) that produce a desired result. In several exemplary embodiments, a computer system may include hybrids of hardware and software, as well as computer sub-systems.

In several exemplary embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several exemplary embodiments, hardware may include any physical device that is capable of storing machine-readable instructions, such as memory or other data storage devices. In several exemplary embodiments, other forms of hardware include hardware sub-systems, including transfer devices such as modems, modem cards, ports, and port cards, for example.

In several exemplary embodiments, software includes any machine code stored in any memory medium, such as RAM or ROM, and machine code stored on other devices (such as floppy disks, flash memory, or a CD ROM, for example). In several exemplary embodiments, software may include source or object code. In several exemplary embodiments, software encompasses any set of instructions capable of being executed on a node such as, for example, on a client machine or server.

In several exemplary embodiments, combinations of software and hardware could also be used for providing enhanced functionality and performance for certain embodiments of the present disclosure. In an exemplary embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several exemplary embodiments, computer readable mediums include, for example, passive data storage, such as a random access memory (RAM) as well as semi-permanent data storage such as a compact disk read only memory (CD-ROM). One or more exemplary embodiments of the present disclosure may be embodied in the RAM of a computer to transform a standard computer into a new specific computing machine. In several exemplary embodiments, data structures are defined organizations of data that may enable an embodiment of the present disclosure. In an exemplary embodiment, a data structure may provide an organization of data, or an organization of executable code.

In several exemplary embodiments, the networks 20 and/or 172, and/or one or more portions thereof, may be designed to work on any specific architecture. In an exemplary embodiment, one or more portions of the networks 20 and/or 172 may be executed on a single computer, local area networks, client-server networks, wide area networks, internets, hand-held and other portable and wireless devices and networks.

In several exemplary embodiments, a database may be any standard or proprietary database software, such as Oracle, Microsoft Access, SyBase, or DBase II, for example. In several exemplary embodiments, the database may have fields, records, data, and other database elements that may be associated through database specific software. In several exemplary embodiments, data may be mapped. In several exemplary embodiments, mapping is the process of associating one data entry with another data entry. In an exemplary embodiment, the data contained in the location of a character file can be mapped to a field in a second table. In several exemplary embodiments, the physical location of the database is not limiting, and the database may be distributed. In an exemplary embodiment, the database may exist remotely from the server, and run on a separate platform. In an exemplary embodiment, the database may be accessible across the Internet. In several exemplary embodiments, more than one database may be implemented.

In several exemplary embodiments, a plurality of instructions stored on a computer readable medium, such as one or more of the computer readable medium 38, the computer readable medium 40, the database 16, the database 30, and/or any combination thereof, may be executed by a processor to cause the processor to carry out or implement in whole or in part one or more of the methods 66, 106, 118, 131, 132, 150 and 161*e*, and/or any combination thereof. In several exemplary embodiments, such a processor may include one or more of the processor 40, the microprocessor 174*a*, and any processor(s) that are a part of the application server 12, the engine 28, the push notification service 24 and the satellite navigation system 26, and/or any combination thereof. In several exemplary embodiments, such a processor may execute the plurality of instructions in connection with a virtual computer system.

A method has been described that includes selecting one of a plurality of home screens to display on a portable user device, comprising determining whether an identifier associated with the portable user device exists; if an identifier associated with the portable user device does not exist, then selecting a first home screen as the one of the plurality of home screens; and if an identifier associated with the portable user device does exist, then: determining whether a travel itinerary or a portion thereof associated with the identifier exists; if a travel itinerary or a portion thereof associated with the identifier does not exist, then selecting a second home screen as the one of the plurality of home screens, wherein the second home screen comprises information specific to the identifier; and if the travel itinerary or a portion thereof associated with the identifier does exist, then selecting one of a third home screen and a fourth home screen as the one of the plurality of home screens, wherein each of the third and fourth home screens comprises information specific to the identifier; and displaying the one of the plurality of home screens on the portable user device. In an exemplary embodiment, selecting the one of the plurality of home screens to display on the portable user device further comprises if an identifier associated with the portable user device does exist and a travel itinerary or a portion thereof associated with the identifier does exist, then determining whether the travel itinerary or a portion thereof will occur within a predetermined time period; if the travel itinerary or a portion thereof will not occur within the predetermined time period, then selecting the third home screen as the one of the plurality of home screens; and if the travel itinerary or a portion thereof will occur within the predetermined time period, then selecting the fourth home screen as the one of the plurality of home screens, wherein the fourth home screen further comprises information specific to the travel itinerary or a portion thereof. In an exemplary embodiment, the one of the third and fourth home screens comprises information specific to the travel itinerary or a portion thereof; wherein the travel itinerary comprises a travel leg to be traveled by a user of the portable user device; wherein the information specific to the travel itinerary or a portion thereof comprises information specific to the travel leg; and wherein the method further comprises determining whether the user has checked in for the travel leg; determining whether the user has obtained a boarding pass for the travel leg; if the user has not checked in for the travel leg, then providing the user with an opportunity to check in for the travel leg using the one of the third and fourth home screens; and if the user has checked in for the travel leg but has not obtained a boarding pass, then providing the user with an opportunity to obtain a boarding pass for the travel leg using the one of the third and fourth home screens. In an exemplary embodiment, the one of the third and fourth home screens comprises information specific to the travel itinerary or a portion thereof; wherein the travel itinerary comprises a plurality of travel legs to be traveled by a user of the portable user device; wherein the information specific to the travel itinerary or a portion thereof comprises information specific to one of the plurality of travel legs; and wherein the method further comprises determining the one of the plurality of travel legs, comprising determining the next travel leg that the user is expected to travel, the next travel leg having a departure location and being part of the plurality of travel legs; determining the location of the user; determining whether the location of the user is consistent with the departure location of the next travel leg; if the location of the user is consistent with the departure location of the next travel leg, then selecting the next travel leg as the one of the plurality of travel legs; and if the location of the user is not consistent with the departure location of the next travel leg, then selecting a different travel leg as the one of the plurality of travel legs, the different travel leg being part of the plurality of travel legs. In an exemplary embodiment, the travel itinerary comprises a travel leg to be traveled by a user of the portable user device; and wherein the method further comprises using the portable user device to determine the location of the user; predicting a location to which the user intends to move; generating directions from the location of the user to the predicted location; and using the portable user device to communicate the directions to the user. In an exemplary embodiment, using the portable user device to determine the location of the user comprises using the portable user device to determine the location of the user using geofencing, comprising determining the geographic area in which the user is located, the geographic area having a defined perimeter, the coordinates of which are stored in one or more of the portable user device and a server in communication with the portable user device; and wherein using the portable user device to communicate the directions to the user comprises sending a push notification to the portable user device, the push notification containing one or more directional instructions to guide the user to the predicted location, the one or more directional instructions being dependent upon the geographic area in which the user is located. In an exemplary embodiment, the travel itinerary is an airline travel itinerary, the travel leg is an airline flight operated by a commercial airline, the airline flight has a departure airport and a departure gate, and the user is a customer of the commercial airline; and wherein predicting the location to which the user intends to move comprises determining whether the user is in the departure airport; if the user is in the departure airport, then identifying the departure gate as the predicted location; and if the user is not in the departure airport, then identifying the departure airport as the predicted location. In an exemplary embodiment, determining whether the user is in the departure airport comprises determining whether the user is in the departure airport using geofencing. In an exemplary embodiment, the travel itinerary comprises a travel leg to be traveled by a user of the portable user device; and wherein the method further comprises detecting a change in the travel itinerary; and sending a push notification to the portable user device informing the user of the change in the travel itinerary.

A method has been described that includes transmitting to a portable device a travel itinerary for a user of the portable user device; detecting a change in the travel itinerary using a server in communication with the portable user device; and automatically sending a push notification to the portable user device informing the user of the change in the travel itinerary in response to detecting the change in the travel itinerary. In an exemplary embodiment, the method includes generating directions to assist the user to adapt to the change in the travel itinerary; and using the portable user device to communicate the directions to the user. In an exemplary embodiment, generating directions to assist the user to adapt to the change in the travel itinerary comprises using the portable user device to determine the location of the user; and generating directions from the location of the user to a location identified as a result of the change in the travel itinerary. In an exemplary embodiment, using the portable user device to determine the location of the user comprises using the portable user device to determine the location of the user using geofencing, comprising determining the geographic area in which the user is located, the geographic area having a defined perimeter, the coordinates of which are stored in one or more of the portable user device and a server in communication with the portable user device; and wherein the method further comprises communicating the directions to the user, comprising sending a push notification to the portable user device, the push notification containing one or more directional instructions to guide the user to the location identified as a result of the change in the travel itinerary, the one or more directional instructions being dependent upon the geographic area in which the user is located.

An apparatus has been described that includes a computer readable medium; and a plurality of instructions stored on the computer readable medium, wherein the plurality of instructions are executable by a processor, and wherein the plurality of instructions comprises instructions that cause the processor to select one of a plurality of home screens to display on a portable user device, comprising instructions that cause the processor to determine whether an identifier associated with the portable user device exists; instructions that, if an identifier associated with the portable user device does not exist, cause the processor to select a first home screen as the one of the plurality of home screens; and instructions that, if an identifier associated with the portable user device does exist, cause the processor to: determine whether a travel itinerary or a portion thereof associated with the identifier exists; if a travel itinerary or a portion thereof associated with the identifier does not exist, then select a second home screen as the one of the plurality of home screens, wherein the second home screen comprises information specific to the identifier; and if the travel itinerary or a portion thereof associated with the identifier does exist, then select one of a third home screen and a fourth home screen as the one of the plurality of home screens, wherein each of the third and fourth home screens comprises information specific to the identifier; and instructions that cause the processor to display the one of the plurality of home screens on the portable user device. In an exemplary embodiment, the instructions that cause the processor to select the one of the plurality of home screens to display on the portable user device further comprise instructions that cause the processor, if an identifier associated with the portable user device does exist and a travel itinerary or a portion thereof associated with the identifier does exist, to determine whether the travel itinerary or a portion thereof will occur within a predetermined time period; instructions that cause the processor, if the travel itinerary or a portion thereof will not occur within the predetermined time period, to select the third home screen as the one of the plurality of home screens; and instructions that cause the processor, if the travel itinerary or a portion thereof will occur within the predetermined time period, to select the fourth home screen as the one of the plurality of home screens, wherein the fourth home screen further comprises information specific to the travel itinerary or a portion thereof. In an exemplary embodiment, the one of the third and fourth home screens comprises information specific to the travel itinerary or a portion thereof; wherein the travel itinerary comprises a travel leg to be traveled by a user of the portable user device; wherein the information specific to the travel itinerary or a portion thereof comprises information specific to the travel leg; and wherein the plurality of instructions further comprises instructions that cause the processor to determine whether the user has checked in for the travel leg; instructions that cause the processor to determine whether the user has obtained a boarding pass for the travel leg; instructions that cause the processor, if the user has not checked in for the travel leg, to provide the user with an opportunity to check in for the travel leg using the one of the third and fourth home screens; and instructions that cause the processor, if the user has checked in for the travel leg but has not obtained a boarding pass, to provide the user with an opportunity to obtain a boarding pass for the travel leg using the one of the third and fourth home screens. In an exemplary embodiment, the one of the third and fourth home screens comprises information specific to the travel itinerary or a portion thereof; wherein the travel itinerary comprises a plurality of travel legs to be traveled by a user of the portable user device; wherein the information specific to the travel itinerary or a portion thereof comprises information specific to one of the plurality of travel legs; and wherein the plurality of instructions further comprises instruction that cause the processor to determine the one of the plurality of travel legs, comprising instructions that cause the processor to determine the next travel leg that the user is expected to travel, the next travel leg having a departure location and being part of the plurality of travel legs; instructions that cause the processor to determine the location of the user; instructions that cause the processor to determine whether the location of the user is consistent with the departure location of the next travel leg; instructions that cause the processor to, if the location of the user is consistent with the departure location of the next travel leg, select the next travel leg as the one of the plurality of travel legs; and instructions that cause the processor to, if the location of the user is not consistent with the departure location of the next travel leg, select a different travel leg as the one of the plurality of travel legs, the different travel leg being part of the plurality of travel legs. In an exemplary embodiment, the travel itinerary comprises a travel leg to be traveled by a user of the portable user device; and wherein the plurality of instructions further comprises instructions that cause the processor to determine the location of the user; instructions that cause the processor to predict a location to which the user intends to move; and instructions that cause the processor to generate directions from the location of the user to the predicted location; and instructions that cause the processor to communicate the directions to the user. In an exemplary embodiment, the instructions that cause the processor to determine the location of the user comprise instructions that cause the processor to determine the location of the user using geofencing, comprising instructions that cause the processor to determine the geographic area in which the user is located, the geographic area having a defined perimeter; and wherein the instructions that cause the processor to communicate the directions to the user comprise instructions that cause the processor to send a push notification to the portable user device, the push notification containing one or more directional instructions to guide the user to the predicted location, the one or more directional instructions being dependent upon the geographic area in which the user is located. In an exemplary embodiment, the travel itinerary is an airline travel itinerary, the travel leg is an airline flight operated by a commercial airline, the airline flight has a departure airport and a departure gate, and the user is a customer of the commercial airline; and wherein the instructions that cause the processor to predict the location to which the user intends to move comprise instructions that cause the processor to determine whether the user is in the departure airport; instructions that cause the processor, if the user is in the departure airport, to identify the departure gate as the predicted location; and instructions that cause the processor, if the user is not in the departure airport, to identify the departure airport as the predicted location. In an exemplary embodiment, the instructions that cause the processor to determine whether the user is in the departure airport comprise instructions that cause the processor to determine whether the user is in the departure airport using geofencing. In an exemplary embodiment, the travel itinerary comprises a travel leg to be traveled by a user of the portable user device; and wherein the plurality of instructions further comprises instructions that cause the processor to detect a change in the travel itinerary; and instructions for sending a push notification to the portable user device informing the user of the change in the travel itinerary.

An apparatus has been described that includes a computer readable medium; and a plurality of instructions stored on the computer readable medium, wherein the plurality of instructions are executable by a processor, and wherein the plurality of instructions comprises instructions that cause the processor to transmit to a portable user device a travel itinerary for a user of the portable user device; instructions that cause the processor to detect a change in the travel itinerary; and instructions that cause the processor to automatically send a push notification to the portable user device informing the user of the change in the travel itinerary in response to detecting the change in the travel itinerary. In an exemplary embodiment, the plurality of instructions further comprises instructions that cause the processor to generate directions to assist the user to adapt to the change in the travel itinerary; and instructions that cause the processor to use the portable user device to communicate the directions to the user. In an exemplary embodiment, the instructions that cause the processor to generate directions to assist the user to adapt to the change in the travel itinerary comprise instructions that cause the processor to use the portable user device to determine the location of the user; and instructions that cause the processor to generate directions from the location of the user to a location identified as a result of the change in the travel itinerary.

A method has been described that includes detecting an identifier, wherein the identifier is associated with a frequent flyer account, the frequent flyer account having a balance of frequent flyer miles; detecting a transaction at an outlet in an airport, comprising detecting a communication between a near field communication (NFC) interface and an external NFC-capable device located at the outlet; and determining a parameter associated with the transaction during the communication between the NFC interface and the external NFC-capable device to thereby detect the transaction; and adjusting the balance of frequent flyer miles of the frequent flyer account in response to the detection of the transaction, the adjustment being dependent upon the parameter. In an exemplary embodiment, the outlet is selected from the group consisting of an airline gate, a restaurant, a retail outlet, and a club; wherein the transaction is selected from the group consisting of a departure from the airline gate, a purchase of a good or service from the restaurant, a purchase of a good or service from the retail outlet, and an entry into the club; and wherein the parameter is selected from the group consisting of permission to depart from the airline gate, the purchase of the good or service from the restaurant, the purchase of the good or service from the retail outlet, the cost to purchase the good or service from the restaurant, the cost to purchase the good or service from the retail outlet, and permission to enter the club. In an exemplary embodiment, the outlet is an airline ticket counter or kiosk; wherein the transaction is a check-in at the airline ticket counter or kiosk to obtain a boarding pass; and wherein the parameter is provision of the boarding pass. In an exemplary embodiment, adjusting the balance of frequent flyer miles of the frequent flyer amount comprises at least one of: adding frequent flyer miles to the balance of frequent flyer miles; and subtracting frequent flyer miles from the balance of frequent flyer miles.

An apparatus has been described that includes a computer readable medium; and a plurality of instructions stored on the computer readable medium, wherein the plurality of instructions are executable by a processor, and wherein the plurality of instructions comprises instructions that cause the processor to detect an identifier, wherein the identifier is associated with a frequent flyer account, the frequent flyer account having a balance of frequent flyer miles; instructions that cause the processor to detect a transaction at an outlet in an airport, comprising instructions that cause the processor to detect a communication between the NFC interface and an external NFC-capable device located at the outlet; and instructions that cause the processor to determine a parameter associated with the transaction during the communication between the NFC interface and the external NFC-capable device, thereby detecting the transaction; and instructions that cause the processor to adjust the balance of frequent flyer miles of the frequent flyer account in response to the detection of the transaction, the adjustment being dependent upon the parameter. In an exemplary embodiment, the outlet is selected from the group consisting of an airline gate, a restaurant, a retail outlet, and a club; wherein the transaction is selected from the group consisting of a departure from the airline gate, a purchase of a good or service from the restaurant, a purchase of a good or service from the retail outlet, and an entry into the club; and wherein the parameter is selected from the group consisting of permission to depart from the airline gate, the purchase of the good or service from the restaurant, the purchase of the good or service from the retail outlet, the cost to purchase the good or service from the restaurant, the cost to purchase the good or service from the retail outlet, and permission to enter the club. In an exemplary embodiment, the outlet is an airline ticket counter or kiosk; wherein the transaction is a check-in at the airline ticket counter or kiosk to obtain a boarding pass; and wherein the parameter is provision of the boarding pass. In an exemplary embodiment, the instructions that cause the processor to adjust the balance of frequent flyer miles of the frequent flyer amount comprise at least one of: instructions that cause the processor to add frequent flyer miles to the balance of frequent flyer miles; and instructions that cause the processor to subtract frequent flyer miles from the balance of frequent flyer miles.

It is understood that variations may be made in the foregoing without departing from the scope of the present disclosure. For example, instead of, or in addition to transportation transactions often conducted in the course of airline industry business, aspects of the present disclosure are applicable and/or readily adaptable to transportation transactions conducted in other industries, including rail, bus, cruise and other travel or shipping industries, rental car industries, hotels and other hospitality industries, entertainment industries, and other industries. In an exemplary embodiment, aspects of the present disclosure are readily applicable and/or readily adaptable to a shipping travel leg in which a ship travels from one port to one or more other ports. In an exemplary embodiment, aspects of the present disclosure are readily applicable and/or readily adaptable to a trucking travel leg during which a truck travels from one city to one or more other cities. In an exemplary embodiment, aspects of the present disclosure are readily applicable and/or readily adaptable to a rail travel leg during which a train travels from one city or station to one or more other cities or stations. In an exemplary embodiment, aspects of the present disclosure are applicable and/or readily adaptable to a wide variety of transportation transactions such as, for example, an airline sequence or itinerary (i.e., a plurality of airline flights), a travel leg of an airline sequence or itinerary (i.e., a single airline flight), an airline block, and/or any combination thereof.

In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes and/or substitutions are intended to be included within the scope of this disclosure as defined in the following claims. In the claims, any means-plus-function clauses are intended to cover the structures described herein as performing the recited function and not only structural equivalents, but also equivalent structures.

The invention claimed is:

1. A system for providing relevant and timely information associated with travel, the system comprising: a non-transitory computer readable medium, the non-transitory computer readable medium comprising a plurality of instructions stored thereon, wherein the instructions are executable by a processor, and wherein the instructions comprise:
   instructions that cause the processor to transmit to a portable user device a travel itinerary for a user of the portable user device;
      wherein the travel itinerary comprises a travel leg to be traveled by the user of the portable user device;
   instructions that cause the processor to detect a change in the travel itinerary;
   instructions that cause the processor to automatically send a push notification to the portable user device informing the user of the change in the travel itinerary in response to detecting the change in the travel itinerary;
      wherein the push notification provides a link that opens an application that is stored in the portable user device that displays, as a home screen, a screen that includes additional details regarding the change in the travel itinerary;
   instructions that cause the processor to determine a location of the user using geofencing, comprising instructions that cause the processor to determine the geographic area in which the user is located, the geographic area having a defined perimeter;
   instructions that cause the processor to predict a location to which the user intends to move;
   instructions that cause the processor to identify, based on the location of the user, information relevant to the user;
      wherein the information relevant to the user is directions from the location of the user to the predicted location; and
   instructions that cause the processor to communicate, to the user, the information relevant to the user, comprising instructions that cause the processor to generate the directions from the location of the user to the predicted location; and wherein the directions comprise one or more directional instructions to guide the user to the predicted location, the one or more directional instructions being dependent upon the geographic area in which the user is located.

2. The system of claim 1, further comprising the portable user device and the application stored therein.

3. The system of claim 1, wherein the push notification includes the additional details regarding the change in the travel itinerary.

4. The system of claim 1, further comprising an application server, wherein the application server is adapted to send to a push notification server a push message regarding the change in the travel itinerary.

5. The system of claim 4, further comprising the push notification server.

6. A method of providing relevant and timely information associated with travel, the method comprising:

transmitting, using a computer system, a travel itinerary to a portable user device, wherein the travel itinerary is for a user of the portable user device;
wherein the travel itinerary comprises a travel leg to be traveled by the user of the portable user device;

detecting, using the computer system, a change in the travel itinerary;

automatically sending, using the computer system, a push notification to the portable user device informing the user of the change in the travel itinerary in response to detecting the change in the travel itinerary;

wherein the push notification provides a link that opens an application that is stored in the portable user device that displays, as a home screen, a screen that includes additional details regarding the change in the travel itinerary;

determining, using the computer system, a location of the user using geofencing, comprising determining the geographic area in which the user is located, the geographic area having a defined perimeter;

predicting, using the computer system, a location to which the user intends to move;

identifying, based on the location of the user and using the computer system, information relevant to the user;
wherein the information relevant to the user is directions from the location of the user to the predicted location; and communicating, to the user and using the computer system, the information relevant to the user, comprising generating, using the computer system, the directions from the location of the user to the predicted location;

wherein the directions comprise one or more directional instructions to guide the user to the predicted location, the one or more directional instructions being dependent upon the geographic area in which the user is located.

7. The method of claim 6, wherein the push notification includes the additional details regarding the change in the travel itinerary.

8. The method of claim 6, further comprising sending a push message to a push notification server, the push message regarding the change in the travel itinerary.

9. The method of claim 8, further comprising sending a push notification from the push notification server to the portable user device, wherein the push notification is associated with push message.

* * * * *